US010560042B2

(12) United States Patent
Matsuyama et al.

(10) Patent No.: US 10,560,042 B2
(45) Date of Patent: Feb. 11, 2020

(54) TURBOCOMPRESSOR COMPRISING A COMPRESSOR MOTOR GENERATING REGENERATIVE ELECTRIC POWER BY REGENERATIVE DRIVING CAPABLE OF DRIVING A COMPRESSOR MOTOR

(71) Applicant: Panasonic Intellectual Property Management Co., Ltd., Osaka (JP)

(72) Inventors: Tetsuya Matsuyama, Nara (JP); Junki Yoshimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 389 days.

(21) Appl. No.: 15/398,802

(22) Filed: Jan. 5, 2017

(65) Prior Publication Data
US 2017/0207733 A1   Jul. 20, 2017

(30) Foreign Application Priority Data

Jan. 15, 2016  (JP) .................................. 2016-005843

(51) Int. Cl.
*H02P 3/14*  (2006.01)
*F04D 17/10*  (2006.01)
(Continued)

(52) U.S. Cl.
CPC ................ *H02P 3/14* (2013.01); *F04D 17/10* (2013.01); *F04D 25/06* (2013.01); *F04D 25/16* (2013.01);
(Continued)

(58) Field of Classification Search
CPC ........ F04D 29/06; F04D 29/063; F04D 17/10; F04D 25/06; F04D 25/0653; F04D 25/16;
(Continued)

(56) References Cited

U.S. PATENT DOCUMENTS 7,233,124 B2 * 6/2007 Takeoka ............... H02P 23/06
318/376
7,669,430 B2 * 3/2010 Matsui ................... F01D 15/10
62/158
(Continued)

FOREIGN PATENT DOCUMENTS

JP    H01-301999    * 6/1989 ............. F04D 29/06
JP    1-301999 A    12/1989
(Continued)

OTHER PUBLICATIONS

Yuichiro Maeda et al., "Operating Characteristics of Direct Torque Control System for Interior Permanent Magnet Synchronous Motors in Overmodulation Region", 2012 IEE-Japan Industry Applications Society Conference, vol. 3, pp. 243-246, Aug. 2012.
(Continued)

Primary Examiner — Devon C Kramer
Assistant Examiner — Benjamin Doyle
(74) Attorney, Agent, or Firm — McDermott Will & Emery LLP

(57) ABSTRACT

A turbocompressor apparatus includes a turbocompressor including a compressor motor, a lubrication pump including a pump motor, a converter that performs electric power conversion between a voltage of a power source and a direct-current voltage of a direct-current voltage unit in a case where electric power is being supplied from the power source to the turbocompressor apparatus; a first inverter that performs electric power conversion between the direct-current voltage and a first alternating-current voltage vector of the compressor motor; and a second inverter that performs electric power conversion between the direct-current voltage and a second alternating-current voltage vector of the pump motor. The compressor motor generates regenerative electric power by regenerative driving and the pump motor is driven by the regenerative electric power in a case
(Continued)

where supply of electric power from the power source to the converter is being cut off.

10 Claims, 11 Drawing Sheets

(51) Int. Cl.

| | | |
|---|---|---|
| *F04D 25/06* | (2006.01) | |
| *F04D 25/16* | (2006.01) | |
| *F04D 27/00* | (2006.01) | |
| *F04D 29/053* | (2006.01) | |
| *F04D 29/056* | (2006.01) | |
| *F04D 29/063* | (2006.01) | |
| *F04D 29/28* | (2006.01) | |
| *H02P 5/74* | (2006.01) | |

(52) U.S. Cl.
CPC .......... *F04D 27/00* (2013.01); *F04D 29/053* (2013.01); *F04D 29/056* (2013.01); *F04D 29/063* (2013.01); *F04D 29/284* (2013.01); *H02P 5/74* (2013.01)

(58) Field of Classification Search
CPC ...... F04D 29/056; F04D 29/057; F04D 27/00; F04D 27/004; F04B 49/06; F04B 39/0207; F04B 17/03; F24F 11/37; F24F 11/46
USPC ................. 417/288, 199, 44.11; 318/376
See application file for complete search history.

(56) References Cited

U.S. PATENT DOCUMENTS

| | | | | |
|---|---|---|---|---|
| 8,283,880 | B2 * | 10/2012 | Iwashita | H02M 7/797 318/362 |
| 8,587,241 | B2 * | 11/2013 | Maeda | H02P 27/045 318/376 |
| 8,672,641 | B2 * | 3/2014 | Yuratich | E21B 43/128 417/44.11 |
| 2007/0101735 | A1 * | 5/2007 | Matsui | F25B 9/06 62/160 |
| 2008/0115527 | A1 * | 5/2008 | Doty | F04D 25/0606 62/498 |
| 2011/0174009 | A1 * | 7/2011 | Iizuka | F04D 25/06 62/305 |

FOREIGN PATENT DOCUMENTS

| | | | | |
|---|---|---|---|---|
| JP | 2010-031698 | | 2/2010 | |
| JP | 2010-048222 A | | 3/2010 | |
| JP | 2010-048222 | * | 4/2010 | .......... F04D 29/063 |
| JP | 2015-126598 | | 7/2015 | |

OTHER PUBLICATIONS

The Extended European Search Report dated Jun. 2, 2017 for the related European Patent Application No. 17151170.2.

* cited by examiner

TURBOCOMPRESSOR COMPRISING A COMPRESSOR MOTOR GENERATING REGENERATIVE ELECTRIC POWER BY REGENERATIVE DRIVING CAPABLE OF DRIVING A COMPRESSOR MOTOR

BACKGROUND

1. Technical Field

The present disclosure relates to a turbocompressor apparatus.

2. Description of the Related Art

Various proposals have been made regarding a system using a compressor and motor control. For example, Japanese Patent No. 5575379 (hereinafter referred to as Patent Literature 1) describes a freezing machine 900 illustrated in FIG. 12. The freezing machine 900 includes a compressor 901, an evaporator 902, a condenser 904, a cooling column 916, and a cooling water pump 918. In the freezing machine 900, water is used as a cooling medium. The compressor 901 has a rotary shaft 910, an impeller 912, and a shaft bearing 920. Water is fed from the cooling column 916 to the condenser 904 and fed from the cooling column 916 to the shaft bearing 920 by discharge pressure of the cooling water pump 918. The water fed to the shaft bearing 920 acts as a lubricant. Japanese Unexamined Patent Application Publication No. 2015-126598 (hereinafter referred to as Patent Literature 2) and Yuichiro MAEDA, Yukinori INOUE, Shigeo MORIMOTO, Masayuki SANADA, "Operating Characteristics of Direct Torque Control System for Interior Permanent Magnet Synchronous Motors in Overmodulation Region", 2012 IEE-Japan Industry Applications Society Conference, Vol. 3, pp. 243-246 (2012-8) (hereinafter referred to as Non-Patent Literature 1) describe motor control.

Because of contact between a rotary shaft and a shaft bearing of a compressor, there is a possibility of wear of the rotary shaft or the shaft bearing. The technique described in Patent Literature 1 has a room for improvement from the perspective of a reduction of wear. The present disclosure was accomplished in view of such circumstances.

SUMMARY

In one general aspect, the techniques disclosed here feature a turbocompressor apparatus that is connectable to a power source, including: a turbocompressor including: a rotary shaft; a shaft bearing that supports the rotary shaft; a compression mechanism that compresses and discharges a cooling medium by rotation of the rotary shaft; a compressor motor that rotates the rotary shaft; and a lubricant supply passage through which a lubricant is supplied to the shaft bearing, a lubrication pump including a pump motor that generates driving force for supplying the lubricant to the shaft bearing through the lubricant supply passage; a converter that performs electric power conversion between a voltage of the power source and a direct-current voltage of a direct-current voltage unit in a case where electric power is being supplied from the power source to the converter; a first inverter that performs electric power conversion between the direct-current voltage and a first alternating-current voltage vector of the compressor motor; and a second inverter that performs electric power conversion between the direct-current voltage and a second alternating-current voltage vector of the pump motor, the compressor motor generating regenerative electric power by regenerative driving and the pump motor being driven by the regenerative electric power in a case where supply of electric power from the power source to the converter is being cut off.

The turbocompressor apparatus according to the present disclosure is advantageous from the perspective of a reduction of wear of a rotary shaft and a shaft bearing.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
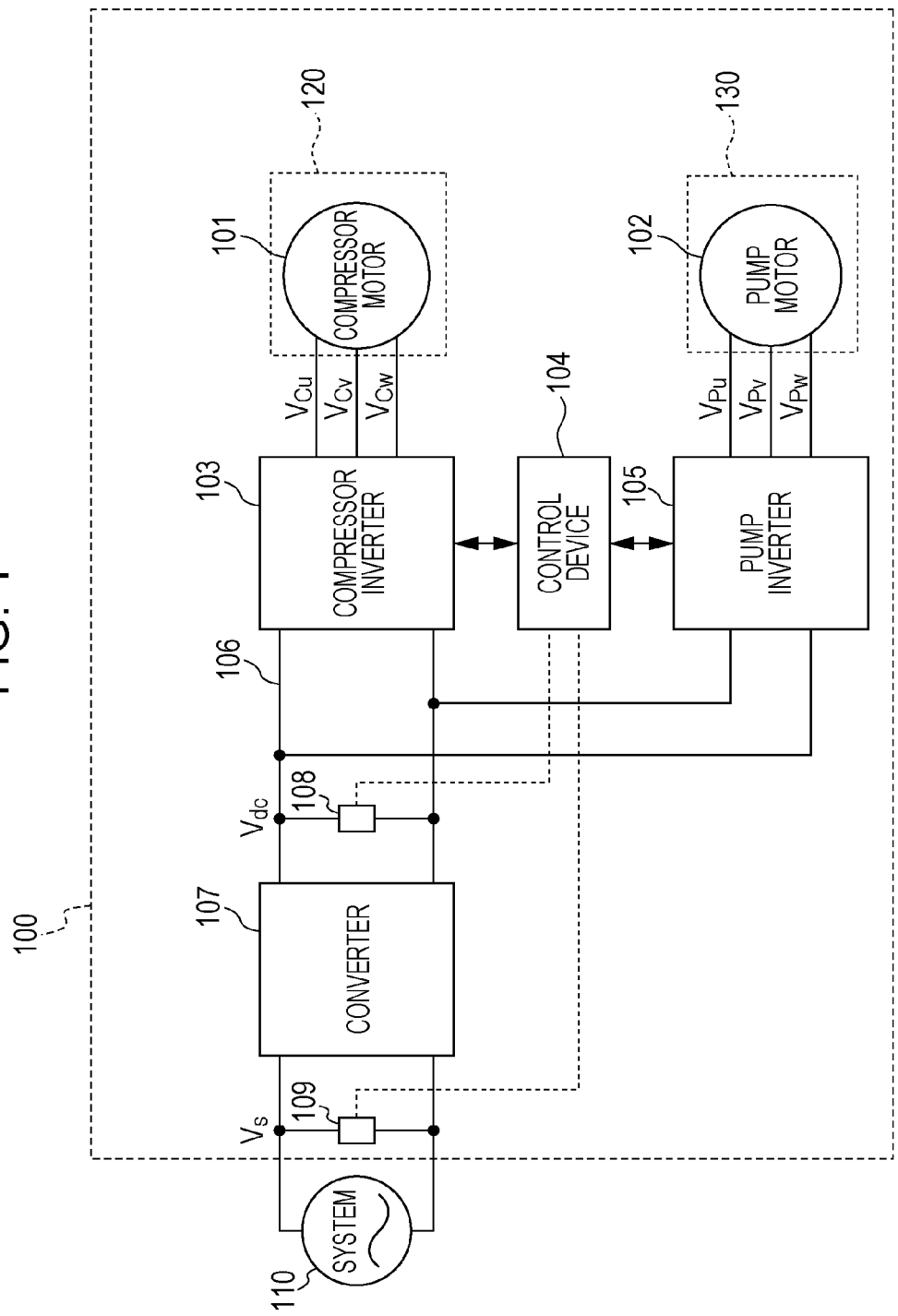
FIG. 1 is a diagram illustrating a configuration of a turbocompressor apparatus.

Underlying Knowledge Forming Basis of the Present Disclosure

To drive a freezing machine like the one described in Patent Literature 1, an inverter for driving a compressor and an inverter for driving a cooling water pump may be provided. However, if supply of electric power from an electric power system is cut off for some reason, electric power is not supplied from these inverters to the compressor and the cooling water pump. Furthermore, the compressor and the cooling water pump are brought into an uncontrolled state (free running state). In such a situation, the rotational speed of the cooling water pump decreases due to a difference in pressure between a portion that precedes the cooling water pump and a portion that follows the cooling water pump and becomes zero in a relatively short period. In the freezing machine of Patent Literature 1, a lubricant (water) is supplied to the shaft bearing of the compressor by using the cooling water pump. It therefore becomes impossible to supply the lubricant to the shaft bearing in a relatively short period. Meanwhile, in the freezing machine of Patent Literature 1, water is used as a cooling medium, and therefore the cooling medium that passes the compressor is in a state of a negative pressure that is lower than atmospheric pressure. Accordingly, in the aforementioned situation, the rotational energy of the compressor gradually decreases, and high-speed rotation of the rotary shaft of the compressor is maintained for a relatively long period. This produces a period in which the rotary shaft of the compressor rotates at high speed without supply of the lubricant to the shaft bearing of the compressor. In this period, the rotary shaft and the shaft bearing of the compressor are likely to make contact with each other, and therefore the rotary shaft and the shaft bearing are likely to be worn away. The wear shortens the lifespan of the compressor and is more likely to cause malfunction of the compressor.

In view of such circumstances, the inventors of the present invention considered a technique that makes it possible to maintain supply of a lubricant to a shaft bearing of a compressor even in a case where supply of electric power from a power source is cut off.

That is, a first aspect of the present disclosure is a turbocompressor apparatus that is connectable to a power source, including:

a turbocompressor including:
a rotary shaft;
a shaft bearing that supports the rotary shaft;
a compression mechanism that compresses and discharges a cooling medium by rotation of the rotary shaft;
a compressor motor that rotates the rotary shaft; and
a lubricant supply passage through which a lubricant is supplied to the shaft bearing,
a lubrication pump including a pump motor that generates driving force for supplying the lubricant to the shaft bearing through the lubricant supply passage;
a converter that performs electric power conversion between a voltage of the power source and a direct-current voltage of a direct-current voltage unit in a case where electric power is being supplied from the power source to the converter;
a first inverter that performs electric power conversion between the direct-current voltage and a first alternating-current voltage vector of the compressor motor; and
a second inverter that performs electric power conversion between the direct-current voltage and a second alternating-current voltage vector of the pump motor,
the compressor motor generating regenerative electric power by regenerative driving and the pump motor being driven by the regenerative electric power in a case where supply of electric power from the power source to the converter is being cut off.

According to the first aspect, the compressor motor is driven as a generator and generates regenerative electric power in a case where supply of electric power from the power source to the converter is being cut off. The lubrication pump is driven by this regenerative electric power. This makes it possible to maintain driving of the lubrication pump and thereby continue supply of a lubricant to the shaft bearing even in a case where supply of electric power from the power source to the converter is being cut off. It is therefore possible to decelerate and stop the turbocompressor while continuing lubrication of the shaft bearing. That is, according to the first aspect, it is possible to provide a reliable turbocompressor apparatus.

In addition to the first aspect, a second aspect of the present disclosure provides a turbocompressor apparatus arranged such that the turbocompressor apparatus performs a normal operation in which the pump motor is driven by using the voltage of the power source in a case where electric power is being supplied from the power source to the converter;

the turbocompressor apparatus performs a first decelerating operation in which an amplitude of the first alternating-current voltage vector is set equal to or smaller than a value that is $R_1$ times the direct-current voltage in a case where supply of electric power from the power source to the converter is being cut off and where the amplitude of the first alternating-current voltage vector is equal to or larger than a first threshold amplitude; and the first threshold amplitude is equal to or larger than an amplitude of the second alternating-current voltage vector in the normal operation, $R_1$ is an upper limit value of a ratio of the amplitude of the first alternating-current voltage vector to the direct-current voltage obtained in a case where the first inverter operates in a linear region, and the linear region of the first inverter is an operation region in which the amplitude of the first alternating-current voltage vector linearly changes in theory relative to the direct-current voltage.

The first decelerating operation in the second aspect is performed in a case where the amplitude of the first alternating-current voltage vector is equal to or larger than the first threshold amplitude. Since the first threshold amplitude is equal to or larger than the amplitude of the second alternating-current voltage vector in the normal operation and is sufficiently large, it is unlikely to bring about a situation where the first decelerating operation is performed in a case where the amplitude of the first alternating-current voltage vector is insufficient and the amplitude of the first alternating-current voltage vector further drops. That is, the amplitude of the first alternating-current voltage vector is unlikely to become insufficient, regenerative electric power of the compressor motor is unlikely to become insufficient, the direct-current voltage is unlikely to become insufficient, the amplitude of the second alternating-current voltage vector is unlikely to become insufficient, and supply of a lubricant to the shaft bearing of the compressor is unlikely to become insufficient. Furthermore, in the first decelerating operation of the second aspect, the first inverter operates in a linear region. That is, according to the second aspect, the first inverter is prevented from operating in an overmodulation region, and a voltage waveform of the compressor motor is prevented from being markedly distorted. It is therefore possible to maintain stable control of the compressor.

In addition to the second aspect, a third aspect of the present disclosure provides a turbocompressor apparatus arranged such that in the first decelerating operation, the amplitude of the first alternating-current voltage vector is set equal to or smaller than the value that is $R_1$ times the direct-current voltage by adjusting rotational speed or torque of the compressor motor.

Adjustment of the rotational speed or the torque of the compressor motor allows the amplitude of the first alternating-current voltage vector to be easily set equal to or smaller than a value that is $R_1$ times the direct-current voltage.

In addition to any one of the first through third aspects, a fourth aspect of the present disclosure provides a turbocompressor apparatus arranged such that the turbocompressor apparatus performs a normal operation in which the pump motor is driven by using the voltage of the power source in a case where electric power is being supplied from the power source to the converter;

the turbocompressor apparatus performs a second decelerating operation in which the direct-current voltage is made closer to a target direct-current voltage in a case where supply of electric power from the power source to the converter is being cut off and where an amplitude of the first alternating-current voltage vector is equal to or larger than a second threshold amplitude and smaller than a first threshold amplitude; and the first threshold amplitude is equal to or larger than an amplitude of the second alternating-current voltage vector in the normal operation, the second threshold amplitude is smaller than the amplitude of the second alternating-current voltage vector in the normal operation, the target direct-current voltage is equal to or larger than a value that is $1/R_2$ times the amplitude of the second alternating-current voltage vector in the normal operation, $R_2$ is an upper limit value of a ratio of the amplitude of the second alternating-current voltage vector to the direct-current voltage obtained in a case where the second inverter operates in a linear region, and the linear region of the second inverter is an operation region in which the amplitude of the second alternating-current voltage vector linearly changes in theory relative to the direct-current voltage.

When the amplitude of the first alternating-current voltage vector drops, the regenerative electric power drops, and the direct-current voltage becomes likely to become insufficient. When the direct-current voltage becomes insufficient, the amplitude of the second alternating-current voltage vector becomes insufficient, and therefore there is a risk of insufficiency of supply of a lubricant to the shaft bearing of the compressor. Furthermore, if the amplitude of the second alternating-current voltage vector is forcibly made large regardless of insufficiency of the direct-current voltage, the second inverter operates in an overmodulation region, and therefore there is a risk of unstable control of the pump motor. It is therefore desirable that a sufficient direct-current voltage be secured even in a case where the amplitude of the first alternating-current voltage vector drops. In this respect, in the second decelerating operation of the fourth aspect, the direct-current voltage is made closer to the target direct-current voltage in a case where the amplitude of the first alternating-current voltage vector is smaller than the first threshold amplitude. The target direct-current voltage is equal to or larger than a value that is $1/R_2$ time the amplitude of the second alternating-current voltage vector in the normal operation, and $R_2$ is an upper limit value of a ratio of the amplitude of the second alternating-current voltage vector to the direct-current voltage obtained in a case where the second inverter operates in a linear region. Accordingly, the direct-current voltage approaches a direct-current voltage at which the same amplitude of the second alternating-current voltage vector as that in the normal operation can be obtained while allowing the second inverter to operate in a linear region. That is, according to the second decelerating operation of the fourth aspect, it is easy to make the direct-current voltage large to a degree such that a lubricant can be sufficiently and stably supplied to the shaft bearing while maintaining stable control of the pump motor.

In addition to the fourth aspect, a fifth aspect of the present disclosure provides a turbocompressor apparatus arranged such that in the second decelerating operation, the direct-current voltage is made closer to the target direct-current voltage by adjusting rotational speed or torque of the compressor motor.

Adjustment of rotational speed or torque of the compressor motor allows the direct-current voltage to be easily made closer to the target direct-current voltage.

In addition to any one of the first through fifth aspects, a sixth aspect of the present disclosure provides a turbocompressor apparatus arranged such that the turbocompressor apparatus performs a normal operation in which the pump motor is driven by using the voltage of the power source in a case where electric power is being supplied from the power source to the converter;

the turbocompressor apparatus performs a first stopping operation in which a zero voltage is applied to the compressor motor and an amplitude of the second alternating-current voltage vector is set equal to or larger than a value that is $R_2$ times the direct-current voltage in a case where supply of electric power from the power source to the converter is being cut off, an amplitude of the first alternating-current voltage vector is smaller than a second threshold amplitude, and rotational speed of the compressor motor is equal to or higher than threshold rotational speed;

the second threshold amplitude is smaller than the amplitude of the second alternating-current voltage vector in the normal operation, $R_2$ is an upper limit value of a ratio of the amplitude of the second alternating-current voltage vector to the direct-current voltage obtained in a case where the second inverter operates in a linear region, and the linear region of the second inverter is an operation region in which the amplitude of the second alternating-current voltage vector linearly changes in theory relative to the direct-current voltage.

In a case where the amplitude of the first alternating-current voltage vector is sufficiently small, the stopping operation of the turbocompressor apparatus can be safely performed as compared with a case where the amplitude of the first alternating-current voltage vector is large. In this respect, according to the sixth aspect, the first stopping operation in which a zero voltage is applied to the compressor motor is performed in a case where the amplitude of the first alternating-current voltage vector is smaller than the second threshold amplitude. By application of the zero voltage to the compressor motor, the rotational speed of the compressor motor decreases. Furthermore, in the first stopping operation of the sixth aspect, the amplitude of the second alternating-current voltage vector is set equal to or smaller than a value that is $R_2$ times the direct-current voltage. $R_2$ is an upper limit value of a ratio of the amplitude of the second alternating-current voltage vector to the direct-current voltage obtained in a case where the second inverter operates in a linear region. This allows the second inverter to operate in the linear region. That is, according to the first stopping operation of the sixth aspect, it is easy to maintain stable control of the lubrication pump and stable supply of a lubricant to the shaft bearing and thereby suppress wear of the shaft bearing and the rotary shaft even in a case where the stopping operation has progresses to a certain extent (in a case where the rotational speed of the compressor motor is low).

In addition to the sixth aspect, a seventh aspect of the present disclosure provides a turbocompressor apparatus arranged such that in the first stopping operation, the amplitude of the second alternating-current voltage vector is set equal to or smaller than the value that is $R_2$ times the direct-current voltage by flux weakening control of the pump motor and/or by adjusting rotational speed of the pump motor.

Flux weakening control of the pump motor and/or adjustment of the rotational speed of the pump motor allow the amplitude of the second alternating-current voltage vector to be easily set equal to or smaller than the value that is $R_2$ times the direct-current voltage.

In addition to any one of the first through seventh aspects, an eighth aspect of the present disclosure provides a turbocompressor apparatus arranged such that the turbocompressor apparatus performs a normal operation in which the pump motor is driven by using the voltage of the power source in a case where electric power is being supplied from the power source to the converter;

the turbocompressor apparatus performs a second stopping operation in which a direct electric current is passed through the compressor motor and an amplitude of the second alternating-current voltage vector is set equal to or smaller than a value that is $R_2$ times the direct-current voltage in a case where supply of electric power from the power source to the converter is being cut off, an amplitude of the first alternating-current voltage vector is smaller than a second threshold amplitude, and rotational speed of the compressor motor is smaller than threshold rotational speed; and the second threshold amplitude is smaller than the amplitude of the second alternating-current voltage vector in the normal operation, $R_2$ is an upper limit value of a ratio of the amplitude of the second alternating-current voltage vector to the direct-current voltage obtained in a case where the second inverter operates in the linear region, and the linear region of the second inverter is an operation region in which the amplitude of the second alternating-current voltage vector linearly changes in theory relative to the direct-current voltage.

In the second stopping operation of the eighth aspect, a direct electric current is passed through the compressor motor (direct-current energization control, or direct-current excitation control). This makes it possible to speedily set the rotational speed of the compressor motor to zero. It is therefore possible to suppress wear of the shaft bearing and the rotary shaft. Furthermore, in the second stopping operation of the eighth aspect, the amplitude of the second alternating-current voltage vector is set equal to or smaller than a value that is $R_2$ times the direct-current voltage. This allows the second inverter to operate in a linear region as described above. This makes it possible to maintain stable control of the lubrication pump.

In addition to the eighth aspect, a ninth aspect of the present disclosure provides a turbocompressor apparatus arranged such that in the second stopping operation, the amplitude of the second alternating-current voltage vector is set equal to or smaller than the value that is $R_2$ times the direct-current voltage by flux weakening control of the pump motor and/or by adjusting rotational speed of the pump motor.

Flux weakening control of the pump motor and/or adjustment of the rotational speed of the pump motor allow the amplitude of the second alternating-current voltage vector to be easily set equal to or smaller than the value that is $R_2$ times the direct-current voltage.

In addition to any one of the first through seventh aspects, a tenth aspect of the present disclosure provides a turbocompressor apparatus arranged such that the turbocompressor apparatus performs a normal operation in which the pump motor is driven by using the voltage of the power source in a case where electric power is being supplied from the power source to the converter;

the turbocompressor apparatus passes a direct electric current through the compressor motor and sets rotational speed of the pump motor to zero in a case where supply of electric power from the power source to the converter is being cut off, an amplitude of the first alternating-current voltage vector is smaller than a second threshold amplitude, and rotational speed of the compressor motor is smaller than threshold rotational speed; and the second threshold amplitude is smaller than an amplitude of the second alternating-current voltage vector in the normal operation.

In the second stopping operation of the tenth aspect, a direct electric current is passed through the compressor motor (direct-current energization control). This makes it possible to speedily set the rotational speed of the compressor motor to zero. It is therefore possible to suppress wear of the shaft bearing and the rotary shaft. Furthermore, in the second stopping operation of the tenth aspect, the rotational speed of the pump motor is set to zero. This makes it possible to speedily stop the turbocompressor apparatus.

An eleventh aspect of the present disclosure provides a fluid apparatus including a turbocompressor apparatus according to any one of the first through tenth aspects.

The fluid apparatus of the eleventh aspect has high reliability for the same reason as the first aspect. Note that the fluid apparatus is, for example, an air-conditioning apparatus.

In addition to the eleventh aspect, a twelfth aspect of the present disclosure provides a fluid apparatus arranged such that the cooling medium is a fluid having a composition C, and the lubricant is a fluid having the composition C.

In the twelfth aspect, the cooling medium and the lubricant are fluids having the same composition. This makes it unnecessary to separate the cooling medium and the lubricant even in a case where the cooling medium and the lubricant are mixed in the turbocompressor. This leads to simplification of the apparatus.

In addition to the twelfth aspect, a thirteenth aspect of the present disclosure provides a fluid apparatus arranged such that the fluid having the composition C is a fluid containing water as a main component.

Burden of water on the global environment is small. For example, water does not destroy an ozone layer and is not a cause of global warming. That is, the fluid apparatus of the thirteenth aspect is environment-friendly.

In addition to any one of the eleventh through thirteenth aspects, a fourteenth aspect of the present disclosure provides a fluid apparatus arranged such that the lubricant is a fluid having the composition C;

the turbocompressor has a lubricant discharge passage through which the lubricant used for lubrication of the shaft bearing is discharged;

the fluid apparatus has one or more flow passages through which the fluid having the composition C circulates; and the lubricant supply passage and the lubricant discharge passage connect the one or more flow passages and the shaft bearing.

In the fourteenth aspect, the lubricant circulates in the fluid apparatus. That is, according to the fourteenth aspect, the lubricant can be effectively utilized.

A fifteenth aspect of the present disclosure provides a method for controlling a turbocompressor apparatus including:

a turbocompressor including:
a rotary shaft;
a shaft bearing that supports the rotary shaft;
a compression mechanism that compresses and discharges a cooling medium by rotation of the rotary shaft;
a compressor motor that rotates the rotary shaft; and
a lubricant supply passage through which a lubricant is supplied to the shaft bearing,
a lubrication pump including a pump motor that generates driving force for supplying the lubricant to the shaft bearing through the lubricant supply passage;
a converter that performs electric power conversion between a voltage of the power source and a direct-current voltage of a direct-current voltage unit in a case where electric power is being supplied from the power source to the converter;

a first inverter that performs electric power conversion between the direct-current voltage and a first alternating-current voltage vector of the compressor motor; and a second inverter that performs electric power conversion between the direct-current voltage and a second alternating-current voltage vector of the pump motor, the compressor motor generating regenerative electric power by regenerative driving and the pump motor being driven by the regenerative electric power in a case where supply of electric power from the power source to the converter is being cut off.

According to the fifteenth aspect, it is possible to obtain the same effect as the first aspect.

A sixteenth aspect of the present disclosure provides a method for controlling a fluid apparatus including the turbocompressor apparatus of the fifteenth aspect, the turbocompressor apparatus being controlled by the method of the fifteenth aspect.

According to the sixteenth aspect, it is possible to obtain the same effect as the eleventh aspect.

A seventeenth aspect of the present disclosure is the turbocompressor apparatus according to any one of the first through tenth aspects in which the direct-current voltage unit is an electric wire that electrically connects the converter, the first inverter, and the second inverter.

The technique of the turbocompressor apparatus and the fluid apparatus is applicable to a method for controlling a turbocompressor apparatus and a method for controlling a fluid apparatus. The technique of the method for controlling a turbocompressor apparatus and the method for controlling a fluid apparatus is applicable to a turbocompressor apparatus and a fluid apparatus.

Embodiments of the present invention are described in detail below with reference to the drawings.

First Embodiment

FIG. 1 illustrates an outline configuration of a turbocompressor apparatus 100 according to the present embodiment. As illustrated in FIG. 1, the turbocompressor apparatus 100 includes a compressor inverter (first inverter) 103, a pump inverter (second inverter) 105, a converter 107, a direct-current voltage unit 106, a control device 104, a compressor 120, a lubrication pump 130, a voltage sensor 108, and a voltage sensor 109. The compressor 120 includes a compressor motor 101. The lubrication pump 130 includes a pump motor 102. The turbocompressor apparatus 100 is connectable to a power source 110. Specifically, the converter 107 is connectable to the power source 110.

The power source 110 supplies a voltage $V_s$ to the turbocompressor apparatus 100. The voltage $V_s$ is an alternating-current voltage. In the present embodiment, the power source 110 is a system power source. The power source 110 may be a single-phase system power source or may be a three-phase system power source. That is, the voltage $V_s$ may be a single-phase system voltage or may be a three-phase system voltage. The power source 110 may be an external power source other than a system power source.

The direct-current voltage unit 106 is typically an electric wire. A direct-current voltage of the direct-current voltage unit 106 is hereinafter referred to as a direct-current voltage $V_{dc}$. In the example illustrated in FIG. 1, the converter 107, the compressor inverter 103, and the pump inverter 105 are connected to the direct-current voltage unit 106. That is, the converter 107, the compressor inverter 103, and the pump inverter 105 are electrically connected by the direct-current voltage unit 106.

The converter 107 has a primary terminal and a secondary terminal. The primary terminal is a terminal on the power source 110 side. The secondary terminal is a terminal on the inverters 103 and 105 side and is connected to the direct-current voltage unit 106.

In a case where electric power is being supplied from the power source 110 to the converter 107, the converter 107 performs electric power conversion between the voltage of the power source 110 and the direct-current voltage $V_{dc}$ of the direct-current voltage unit 106. Specifically, the voltage $V_s$ is converted into the direct-current voltage $V_{dc}$ by rectifying the voltage $V_s$. The converter 107 of the present embodiment can change the direct-current voltage $V_{dc}$. Note that in a case where the compressor motor 101 is regeneratively driven, the direct-current voltage $V_{dc}$ is one derived from regenerative electric power of the compressor motor 101. A known converter can be used as the converter 107. Examples of the converter 107 include a diode bridge. A specific example of the converter 107 is a three-phase PWM converter.

The compressor inverter 103 is connected to the direct-current voltage unit 106 and the compressor motor 101. The compressor inverter 103 performs electric power conversion between the direct-current voltage $V_{dc}$ of the direct-current voltage unit 106 and a first alternating-current voltage vector of the compressor motor 101. In a case where the compressor motor 101 is power-driven, the compressor inverter 103 can convert the direct-current voltage $V_{dc}$ into the first alternating-current voltage vector so that the first alternating-current voltage vector becomes a desired alternating-current voltage vector. In a case where the compressor motor 101 is regeneratively driven, the compressor inverter 103 can convert the first alternating-current voltage vector into the direct-current voltage $V_{dc}$ so that the direct-current voltage $V_{dc}$ becomes a desired direct-current voltage. The compressor inverter 103 of the present embodiment is a three-phase alternating-current inverter using a semiconductor switching element such as a power MOSFET or an IGBT. The compressor inverter 103 of the present embodiment is a PWM inverter. The first alternating-current voltage vector of the present embodiment is a three-phase alternating-current voltage.

Figure 2:
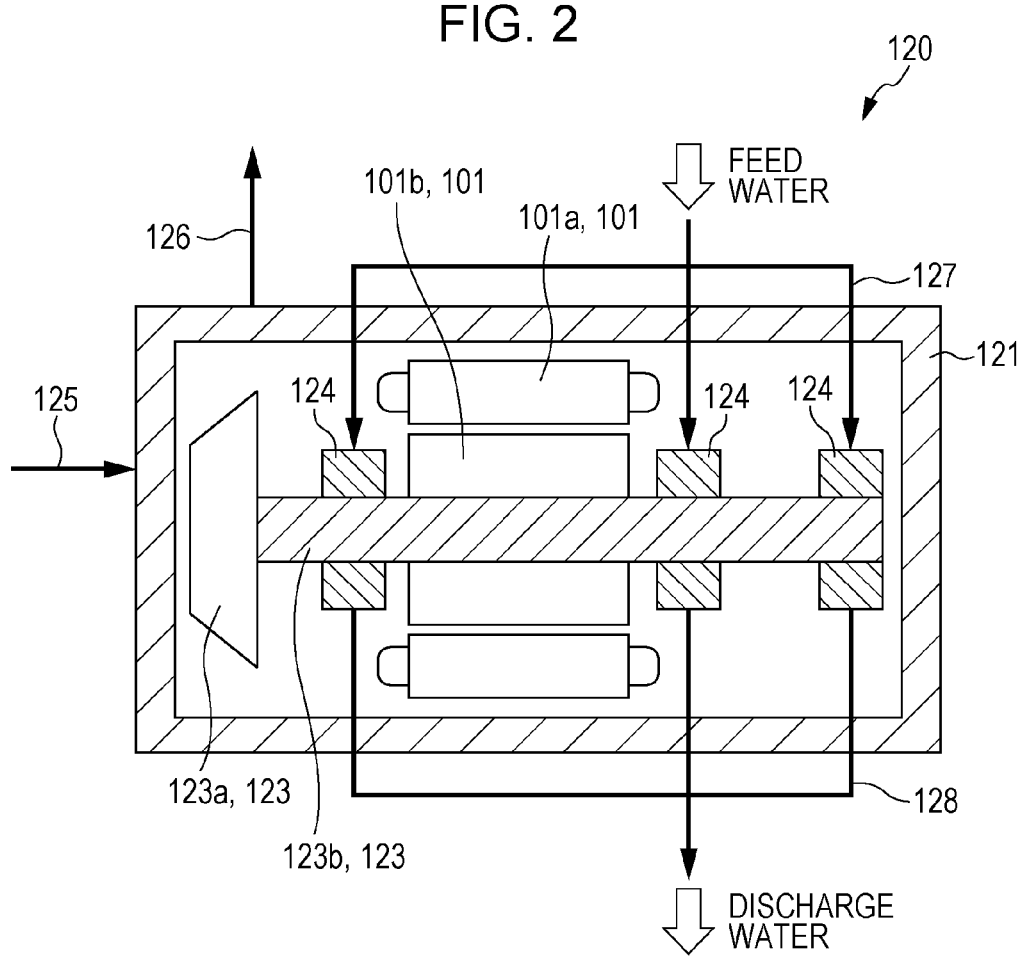
FIG. 2 is a diagram illustrating a configuration of a compressor.

The compressor 120 is a turbo (centrifugal) compressor. The compressor 120 of the present embodiment illustrated in FIG. 2 includes a housing 121, a rotating member 123, a shaft bearing 124, a compressor motor 101, a compressor induction pipe 125, a compressor discharge pipe 126, a lubricant supply passage 127, and a lubricant discharge passage 128. Note that the compressor 120 may be a single-stage compressor or may be a multistage compressor.

The housing 121 has an inner space. In this inner space, the rotating member 123, the shaft bearing 124, and the compressor motor 101 are disposed.

The rotating member 123 includes a compression mechanism 123a and a rotary shaft 123b. The compression mechanism 123a may be an impeller. The compressor motor 101 includes a stator 101a and a rotor 101b. The compression mechanism 123a and the rotor 101b are attached to the rotary shaft 123b. The rotor 101b, the rotary shaft 123b, and the compression mechanism 123a rotate due to driving force of the compressor motor 101, and the compression mechanism 123a compresses a cooling medium (working fluid). The cooling medium is specifically a cooling medium gas, more specifically vapor that contains water as a main component. The cooling medium is introduced from an outside of the housing 121 into the compression mechanism 123a through the compressor induction pipe 125. The compressed cooling medium is discharged from the compression mechanism 123a to the outside of the housing 121 through the compressor discharge pipe 126. The compressor induction pipe 125 and the compressor discharge pipe 126 are connected to the compression mechanism 123a.

In the present embodiment, a plurality of shaft bearings 124 are provided. The plurality of shaft bearings 124 are disposed at intervals along the rotary shaft 123b. In the present embodiment, the shaft bearings 124 are plain shaft bearings and are located at positions including both ends of the compressor motor 101. Examples of a plain shaft bearing include a journal shaft bearing and a thrust shaft bearing. To the shaft bearings 124, a lubricant (a lubricant that contains water as a main component in this example) is supplied from the outside of the housing 121 through the lubricant supply passage 127. The lubricant that has been used for lubrication is discharged to the outside of the housing 121 through the lubricant discharge passage 128. Note that the shaft bearings 124 may be rolling shaft bearings. The rolling shaft bearings can be lubricated in a manner similar to the case of the plain shaft bearings.

The compressor motor 101 is, for example, a synchronous motor or an induction motor. A specific example of the compressor motor 101 is an interior permanent magnet synchronous motor (IPMSM), which is one kind of permanent magnet motor. The interior permanent magnet synchronous motor has saliency, i.e., a difference between d-axis inductance $L_d$ and q-axis inductance $L_q$ (in general, inverse saliency $L_d > L_q$) and can utilize reluctance torque in addition to magnet torque. Accordingly, the motor efficiency of the interior permanent magnet synchronous motor is extremely high. Furthermore, the compressor motor 101 exhibits extremely high generator efficiency during regenerative braking. Shaft output of the compressor motor 101 is transmitted to the compression mechanism 123a of the compressor 120.

See FIG. 1 again. The pump inverter 105 is connected to the direct-current voltage unit 106 and the pump motor 102. The pump inverter 105 performs electric power conversion between the direct-current voltage $V_{dc}$ of the direct-current voltage unit 106 and a second alternating-current voltage vector of the pump motor 102. The pump inverter 105 can convert the direct-current voltage $V_{dc}$ into the second alternating-current voltage vector so that the second alternating-current voltage vector becomes a desired alternating-current voltage vector. The pump inverter 105 of the present embodiment is a three-phase alternating-current inverter using a semiconductor switching element such as a power MOSFET or an IGBT. The pump inverter 105 of the present embodiment is a PWM inverter. In the present embodiment, the pump inverter 105 is the same inverter as the compressor inverter 103. However, the pump inverter 105 may be an inverter that is different from the compressor inverter 103. The second alternating-current voltage vector of the present embodiment is a three-phase alternating-current voltage.

The lubrication pump 130 pressure-feeds a lubricant to the shaft bearings 124 by using the pump motor 102. Specifically, the lubrication pump 130 sucks in the lubricant and supplies the lubricant to the shaft bearings 124 through the lubricant supply passage 127 of the compressor 120.

The pump motor 102 is, for example, a synchronous motor or an induction motor as in the case of the compressor motor 101. A specific example of the pump motor 102 is an interior permanent magnet synchronous motor (IPMSM) as in the case of the compressor motor 101. Shaft output of the pump motor 102 is transmitted to a pressure-feeding mechanism of the lubrication pump 130.

The voltage sensor 109 detects the voltage $V_s$. The voltage sensor 109 is provided on a primary terminal side (power source 110 side) of the converter 107.

The voltage sensor 108 detects the direct-current voltage $V_{dc}$. The voltage sensor 108 is provided on a secondary terminal side (inverters 103 and 105 side) of the converter 107.

Figure 3:
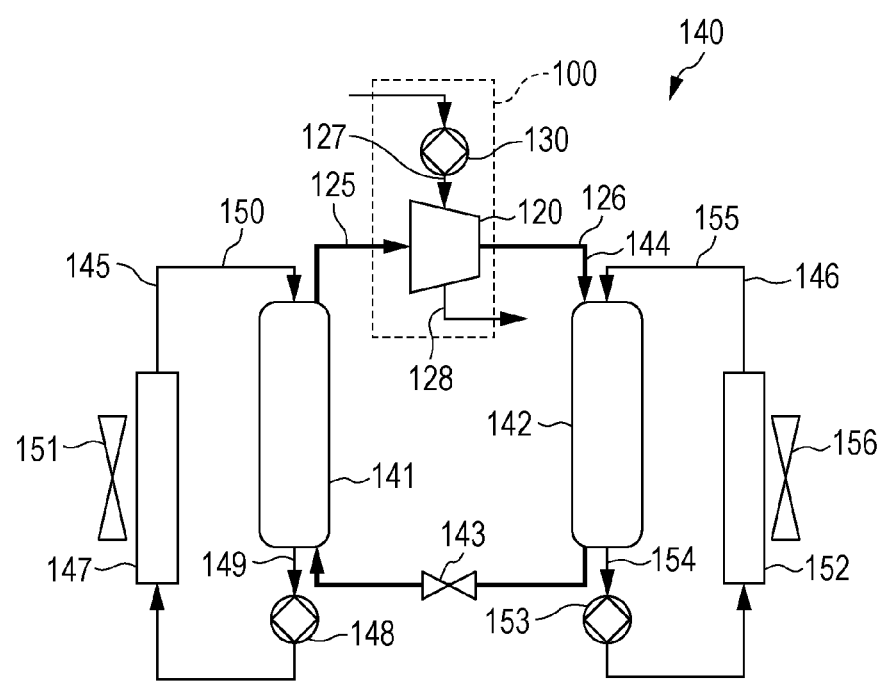
FIG. 3 is a diagram illustrating a configuration of an air-conditioning apparatus.

FIG. 3 illustrates a configuration of an air-conditioning apparatus 140. As illustrated in FIG. 3, the air-conditioning apparatus 140 includes the turbocompressor apparatus 100, a cooling medium circuit 144, a first circulation passage 145, and a second circulation passage 146. In the present embodiment, the cooling medium circuit 144, the first circulation passage 145, and the second circulation passage 146 are filled with a cooling medium that contains water as a main component. The "main component" as used herein refers to a component that is contained in the largest amount on the weight basis. The cooling medium may contain a component such as an antifreezing agent. The pressure in the cooling medium circuit 144, the first circulation passage 145, and the second circulation passage 146 is a negative pressure that is lower than atmospheric pressure.

The lubrication pump 130 is one of the constituent elements of the turbocompressor apparatus 100. The lubrication pump 130 of the present embodiment sucks in a lubricant (a lubricant that contains water as a main component in this example) from any of the cooling medium circuit 144, the first circulation passage 145, and the second circulation passage 146. The lubrication pump 130 pressure-feeds the lubricant thus sucked in to the shaft bearings 124 through the lubricant supply passage 127. In this way, the lubricant is supplied to the shaft bearings 124. The lubricant that has lubricated the shaft bearings 124 is discharged through the lubricant discharge passage 128. A place into which the lubricant of the present embodiment is discharged may be any of the cooling medium circuit 144, the first circulation passage 145, and the second circulation passage 146.

The cooling medium circuit 144 includes an evaporator 141, the compressor 120, a condenser 142, and a decompression mechanism 143. In the cooling medium circuit 144, the evaporator 141, the compressor 120, the condenser 142, and the decompression mechanism 143 are connected in this order by a flow passage. The cooling medium circuit 144 circulates a cooling medium.

The evaporator 141 stores therein a cooling medium liquid and evaporates the cooling medium liquid therein.

The compressor 120 is one of the constituent elements of the cooling medium circuit 144 and is also one of the constituent elements of the turbocompressor apparatus 100. As for the details of the compressor 120, see FIG. 2.

The condenser 142 condenses cooling medium vapor and stores the cooling medium liquid therein.

The decompression mechanism 143 decompresses the cooling medium liquid that is introduced from the condenser 142 into the evaporator 141. The decompression width of the decompression mechanism 143 is variable. In the present embodiment, an electronic expansion valve is used as the decompression mechanism 143. The decompression mechanism 143 can be adjusted so that a desired cycle operation point is secured.

The first circulation passage 145 includes a first heat exchanger 147, a first feed passage 149, and a first return passage 150. The first heat exchanger 147 includes an air blower 151. The first feed passage 149 includes a first pump 148. The first circulation passage 145 (specifically, both ends of the first circulation passage 145) is connected to the evaporator 141. The first circulation passage 145 allows the cooling medium liquid stored in the evaporator 141 to be circulated so as to pass the first heat exchanger 147.

Specifically, the cooling medium liquid is pressure-fed by the first pump 148. The first feed passage 149 introduces the cooling medium liquid from the evaporator 141 to the first heat exchanger 147. The first heat exchanger 147 is installed inside or outside a room and cools air supplied by the air blower 151 through heat exchange with the cooling medium liquid. The first return passage 150 introduces the cooling medium liquid from the first heat exchanger 147 to the evaporator 141.

In this way, the cooling medium liquid is heated by the first heat exchanger 147 and then returns to the inside of the evaporator 141 from a downstream end of the first circulation passage 145. The cooling medium liquid that has returned to the inside of the evaporator 141 boils in the evaporator 141 under a decompression condition. Note that the cooling medium liquid that returns to the inside of the evaporator 141 may be sprayed from the downstream end of the first circulation passage 145.

The second circulation passage 146 includes a second heat exchanger 152, a second feed passage 154, and a second return passage 155. The second heat exchanger 152 includes an air blower 156. The second feed passage 154 includes a second pump 153. The second circulation passage 146 (specifically, both ends of the second circulation passage 146) is connected to the condenser 142. The second circulation passage 146 allows the cooling medium liquid stored in the condenser 142 to be circulated so as to pass the second heat exchanger 152.

Specifically, the cooling medium liquid is pressure-fed by the second pump 153. The second feed passage 154 introduces the cooling medium liquid from the condenser 142 to the second heat exchanger 152. The second heat exchanger 152 is installed outside the room in a case where the first heat exchanger 147 is installed inside the room, whereas the second heat exchanger 152 is installed inside the room in a case where the first heat exchanger 147 is installed outside the room. The second heat exchanger 152 heats air supplied by the air blower 156 through heat exchange with the cooling medium liquid. The second return passage 155 introduces the cooling medium liquid from the second heat exchanger 152 to the condenser 142.

In this way, the cooling medium liquid is cooled by the second heat exchanger 152 and returns to the inside of the condenser 142 from a downstream end of the second circulation passage 146. The cooling medium liquid that has returned to the inside of the condenser 142 directly makes contact with the cooling medium vapor discharged from the compressor 120 in the evaporator 141, thereby cooling and condensing the cooling medium vapor. Note that the cooling medium liquid that returns to the inside of the condenser 142 may be sprayed from the downstream end of the second circulation passage 146.

A fin and tube heat exchanger can be, for example, used as the first heat exchanger 147 and the second heat exchanger 152. In a case where the first heat exchanger 147 is installed inside the room, the air-conditioning apparatus 140 exclusive for cooling is obtained. Meanwhile, in a case where the second heat exchanger 152 is installed inside the room, the air-conditioning apparatus 140 exclusive for heating is obtained. Note that one of the first heat exchanger 147 and the second heat exchanger 152 that is installed outside the room need not necessarily be one that performs heat exchange between air and the cooling medium liquid and may be, for example, one that performs heat exchange between a liquid such as industrial water and the cooling medium liquid.

See FIG. 1 again. The control device 104 controls the compressor inverter 103 and the pump inverter 105. The control device 104 can be, for example, made up of a microcomputer or a digital signal processor (DSP) and a memory. The control device 104 performs a proper control operation not only in a case where the compressor motor 101 is power-driven, for example, during a normal operation (in a case where electric power is being supplied from the power source 110 to the turbocompressor apparatus 100), but also in a case where the compressor motor 101 is regeneratively driven, for example, during power cutoff (in a case where supply of electric power from the power source 110 to the turbocompressor apparatus 100 is being cut off).

In the normal operation, the control device 104 controls the compressor inverter 103 so that the compressor 120 demonstrates performance requested in the air-conditioning apparatus 140 that will be described later. The control device 104 adjusts the rotational speed $\omega_{Ca}$ of the compressor motor 101 in one example and adjusts torque of the compressor motor 101 in another example by controlling the compressor inverter 103. The control device 104 controls the pump inverter 105 so that a lubricant is supplied to the shaft bearings 124 of the compressor 120 in a necessary amount corresponding to the rotational speed $\omega_{Ca}$ of the compressor motor 101. The control device 104 adjusts the rotational speed $\omega_{Pa}$ of the pump motor 102 in one example by controlling the pump inverter 105.

In the present embodiment, the control device 104 determines whether or not electric power is being supplied from the power source 110 to the turbocompressor apparatus 100 (specifically, to the converter 107) by using the voltage sensor 109. In a case where supply of electric power is being cut off, the control device 104 causes the compressor motor 101 to be regeneratively driven in accordance with a voltage detected by the voltage sensor 108 and a voltage of the compressor motor 101. Furthermore, the control device 104 changes the rotational speed $\omega_{Pa}$, voltage, and the like of the pump motor 102 in accordance with the voltage detected by the voltage sensor 108 and the voltage of the pump motor 102.

Normal Operation

The normal operation of the turbocompressor apparatus 100 is described. The normal operation is performed in a case where electric power is being supplied from the power source 110 to the converter 107. In the normal operation, the turbocompressor apparatus 100 drives the pump motor 102 by using the voltage of the power source 110. This is specifically described below.

In the normal operation, the compressor inverter 103 applies a voltage to the compressor motor 101 on the basis of command rotational speed $\omega_C^*$. The command rotational speed $\omega_C^*$ is given, for example, from a higher-level control device to the turbocompressor apparatus 100 (specifically, the control device 104). The command rotational speed $\omega_C^*$ is rotational speed which the rotational speed $\omega_{Ca}$ of the compressor motor 101 should follow. In the normal operation of the present embodiment, a voltage is applied to the compressor motor 101 so that the compressor motor 101 operates at maximum efficiency (minimum copper loss). Specifically, a Maximum Torque per Ampere control (MTPA) method in which maximum torque can be generated by a minimum electric current is executed. The pump inverter 105 applies a voltage to the pump motor 102 on the basis of command rotational speed $\omega_P^*$. The command rotational speed $\omega_P^*$ is given, for example, from a higher-level control device to the turbocompressor apparatus 100 (specifically, the control device 104). The command rotational speed $\omega_P^*$ is rotational speed which the rotational speed $\omega_{Pa}$ of the pump motor 102 should follow. In the normal operation of the present embodiment, a voltage is applied to the pump motor 102 so that the pump motor 102 operates at maximum efficiency (minimum copper loss). Specifically, the MTPA method is executed. These control operations can be performed, for example, by using a method based on rotating coordinates (d-q coordinates) that rotate in synchronization with the position of a rotor of a motor or a method based on stationary coordinates ($\alpha$-$\beta$ coordinates).

In the present embodiment, a first command alternating-current voltage vector is specified from the command rotational speed $\omega_C^*$. The first command alternating-current voltage vector is a voltage vector which the first alternating-current voltage vector of the compressor motor 101 should follow. Specifically, two-phase command voltages $V_{C\alpha}^*$ and $V_{C\beta}^*$ are computed on the basis of $\alpha$-$\beta$ coordinates. Furthermore, three-phase command voltages $V_{Cu}^*$, $V_{Cv}^*$, and $V_{Cw}^*$ are computed from the command voltages $V_{C\alpha}^*$ and $V_{C\beta}^*$ on the basis of the formula 1. An amplitude $V_{Ca}$ of the first command alternating-current voltage vector is computed on the basis of the formula 2. The control device 104 is in charge of these computing processes. The first command alternating-current voltage vector and the command voltages $V_{C\alpha}^*$ and $V_{C\beta}^*$ and the command voltages $V_{Cu}^*$, $V_{Cv}^*$, and $V_{Cw}^*$ are the same except for that they are on different coordinate systems. See, for example, Patent Literature 2 (e.g., FIG. 4) as for details of a method for specifying the command voltage $V_{Cu}^*$, $V_{Cv}^*$, and $V_{Cw}^*$ from the command rotational speed $\omega_C^*$ on the basis of the $\alpha$-$\beta$ coordinates. In the present embodiment, a control process using a measured value of an electric current of the compressor motor 101 can be performed as in Patent Literature 2. The "amplitude" as used herein simply refers to the magnitude (absolute value) in some cases.

$$\begin{bmatrix} v_{Cu}^* \\ v_{Cv}^* \\ v_{Cw}^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_{C\alpha}^* \\ v_{C\beta}^* \end{bmatrix} \quad \text{formula 1}$$

$$V_{Ca} = \sqrt{v_{C\alpha}^{*2} + v_{C\beta}^{*2}} \quad \text{formula 2}$$

In the present embodiment, the second command alternating-current voltage vector is specified from the command rotational speed $\omega_P^*$. The second command alternating-current voltage vector is a voltage vector which the second alternating-current voltage vector of the pump motor 102 should follow. Specifically, two-phase command voltages $V_{Pd}^*$ and $V_{Pq}^*$ are computed on the basis of the d-q coordinates. Furthermore, three-phase command voltages $V_{Pu}^*$, $V_{Pv}^*$, and $V_{Pw}^*$ are computed from the command voltages $V_{Pd}^*$ and $V_{Pq}^*$ on the basis of the formula 3. The angle $\theta$ of the formula 3 is a lead angle of a d axis when viewed from a U axis. An amplitude $V_{Pa}$ of the second command alternating-current voltage vector can be computed on the basis of the formula 4. The control device 104 is in charge of these computing processes. Note that the second command alternating-current voltage vector and the command voltages $V_{Pd}^*$ and $V_{Pq}^*$ and the command voltages $V_{Pu}^*$, $V_{Pv}^*$, and $V_{Pw}^*$ are the same except for that they are on different coordinate systems. See, for example, a known document (e.g., Yoji TAKEDA, Shigeo MORIMOTO, Nobuyuki MATSUI, Yukio HONDA "Umekomi Jisyaku Douki Mota No Sekkei To Seigyo (Design and Control of Interior Permanent Magnet Synchronous Motor)" Ohmsha, Ltd., issued on Oct. 25, 2001) as for details of a method for specifying the command voltages $V_{Pu}^*$, $V_{Pv}^*$, and $V_{Pw}^*$ from the command rotational speed $\omega_P^*$ on the basis of the d-q coordinates.

$$\begin{bmatrix} v_{Pu}^* \\ v_{Pv}^* \\ v_{Pw}^* \end{bmatrix} = \sqrt{\frac{2}{3}} \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} v_{Pd}^* \\ v_{rq}^* \end{bmatrix} \quad \text{formula 3}$$

$$V_{Pa} = \sqrt{v_{Pd}^{*2} + v_{Pq}^{*2}} \quad \text{formula 4}$$

Note that a voltage may be applied to the compressor motor 101 on the basis of not the command rotational speed $\omega_C^*$ but command torque $T_C^*$. In another example of the present embodiment, a voltage is applied to the compressor motor 101 in this way. The command torque $T_C^*$ is torque which the torque $T_{Ca}$ of the compressor motor 101 should follow. The command torque $T_C^*$ is, for example, given from a higher-level control device to the turbocompressor apparatus 100 (specifically, the control device 104). In the normal operation, a voltage can be applied to the compressor motor 101 so that the compressor motor 101 operates at maximum efficiency (minimum copper loss). Specifically, the MTPA method can be executed. Specifically, the first command alternating-current voltage can be specified from the command torque $T_C^*$. The control device 104 is also in charge of these computing processes.

In the normal operation of the present embodiment, the command rotational speed $\omega_C^*$ of the compressor motor 101 is set to target rotational speed for compressor. Typically, this target rotational speed is constant (i.e., does not change over time). Accordingly, the amplitude of the first command alternating-current voltage vector is kept constant. The amplitude of the first alternating-current voltage vector is also kept constant. The command rotational speed $\omega_P^*$ of the pump motor 102 is set to target rotational speed for pump. Typically, this target rotational speed is constant. Accordingly, the amplitude of the second command alternating-current voltage vector is also kept constant. The amplitude of the second alternating-current voltage vector is also kept constant. In the other example in which a voltage is applied to the compressor motor 101 on the basis of the command torque $T_C^*$, the command torque $T_C^*$ can be set to target torque for compressor. The target torque, the amplitude of the first command alternating-current voltage vector, and the amplitude of the first alternating-current voltage vector can be constant.

The direct-current voltage $V_{dc}$ need be sufficiently large in order to apply a first alternating-current voltage vector having small waveform distortion to the compressor motor 101 or to apply a second alternating-current voltage vector having small waveform distortion to the pump motor 102. Specifically, the amplitude $V_{Ca}$ and the direct-current voltage $V_{dc}$ need satisfy the relationship expressed by the formula 5A, and the amplitude $V_{Pa}$ and the direct-current voltage $V_{dc}$ need satisfy the relationship expressed by the formula 5B. Note that the equality holds in the formula 5A when the compressor inverter 103 operates at a boundary between a linear region and an overmodulation region, and the equality holds in the formula 5B when the pump inverter 105 operates at a boundary between a linear region and an overmodulation region. That is, the formula 5A is satisfied when the compressor inverter 103 operates in the linear region, and the formula 5B is satisfied when the pump inverter 105 operates in the linear region. In the normal operation of the present embodiment, the compressor inverter 103 and the pump inverter 105 operate in the linear region. Note that the coefficient √3/2√2 on the right sides of the formulas 5A and 5B is a coefficient used in a case where a sine wave PWM method is employed as a modulation method of the inverters 103 and 105. Another coefficient can be used in a case where another modulation method is used. For example, in a case where a third harmonic injection modulation method is employed, the coefficient on the right sides of the formulas 5A and 5B is changed from √3/2√2 to 1/√2.

$$V_{Ca} \le \frac{\sqrt{3}}{2\sqrt{2}} V_{dc} \qquad \text{formula 5A}$$

$$V_{Pa} \le \frac{\sqrt{3}}{2\sqrt{2}} V_{dc} \qquad \text{formula 5B}$$

The linear region is described below. The linear region is an operation region in which the amplitude of a secondary-side alternating-current voltage vector of an inverter linearly changes in theory relative to a primary-side direct-current voltage of the inverter. That is, the linear region of the compressor inverter 103 is an operation region in which the amplitude of the first alternating-current voltage vector linearly changes in theory relative to the direct-current voltage $V_{dc}$. The linear region of the pump inverter 105 is an operation region in which the amplitude of the second alternating-current voltage vector linearly changes in theory relative to the direct-current voltage $V_{dc}$. The linear region is also described in a known document (e.g., Non-Patent Literature 1). As described above, in a case where an inverter is operated in the linear region, an alternating-current voltage vector having small waveform distortion can be obtained.

By performing the aforementioned computing processes sequentially (typically every control period), the control device 104 generates the command voltages $V_{Cu}^*$, $V_{Cv}^*$, and $V_{Cw}^*$ for driving the compressor motor 101 and the command voltages $V_{Pu}^*$, $V_{Pv}^*$, and $V_{Pw}^*$ for driving the pump motor 102. The compressor inverter 103 and the pump inverter 105 apply actual voltages to the compressor motor 101 and the pump motor 102 on the basis of the generated command voltages, respectively. In this way, each of the compressor motor 101 and the pump motor 102 is driven at desired rotational speed. Specifically, the rotational speed $\omega_{Ca}$ of the compressor motor 101 follows the command rotational speed $\omega_C^*$, and the rotational speed $\omega_{Pa}$ of the pump motor 102 follows the command rotational speed $\omega_P^*$.

By thus driving the pump motor 102 as described above, a cooling medium can be pressure-fed by the lubrication pump 130. The cooling medium pressure-fed by the lubrication pump 130 flows to the shaft bearings 124 through the lubricant supply passage 127 in the compressor 120 and is thus supplied as a lubricant to the shaft bearings 124. The supplied cooling medium (lubricant) is discharged to the outside of the housing 121 through the lubricant discharge passage 128. This makes it possible to supply a predetermined amount of lubricant to the shaft bearings 124 even while the compressor 120 is being driven at high speed, thereby achieving the turbocompressor apparatus 100 having high reliability.

Next, the normal operation of the air-conditioning apparatus 140 of the present embodiment is described. Saturated vapor of the cooling medium vaporized in the evaporator 141 is brought into an overheated state by being sucked in and compressed by the compressor 120. The cooling medium vapor discharged from the compressor 120 is condensed in the condenser 142 through heat exchange with a cooling medium liquid over-cooled by the second heat exchanger 152. A major part of the cooling medium liquid condensed in the condenser 142 is pressure-fed to the second heat exchanger 152 by the second pump 153. The cooling medium liquid pressure-fed to the second heat exchanger 152 releases heat to the air in the second heat exchanger 152 and then returns to the condenser 142. A remaining part of the cooling medium liquid condensed in the condenser 142 is decompressed by the decompression mechanism 143 and is then introduced into the evaporator 141. The degree of opening of the decompression mechanism 143 is adjusted so that a desired operation point is secured. Specifically, the degree of opening of the decompression mechanism 143 is controlled to be made smaller in a case where the pressure of the cooling medium vapor discharged from the compressor 120 is higher than a predetermined value. A major part of the cooling medium liquid in the evaporator 141 is pressure-fed to the first heat exchanger 147 by the first pump 148. The cooling medium liquid pressure-fed to the first heat exchanger 147 absorbs heat in the first heat exchanger 147 and then returns to the evaporator 141. The cooling medium liquid in the evaporator 141 is boiled under a decompression condition and thus evaporates, and the cooling medium vapor thus vaporized is sucked in by the compressor 120. The cooling medium vapor is compressed again by the compressor 120. In this way, a cooling cycle based on a saturated vapor line and a saturated liquid line is repeated.

Decelerating Operation and Stopping Operation

The turbocompressor apparatus 100 and the air-conditioning apparatus 140 of the present embodiment can perform a decelerating operation and a stopping operation. The decelerating operation and the stopping operation of the present embodiment are performed in a case where supply of electric power from the power source 110 to the converter 107 is cut off. In the decelerating operation and the stopping operation, the turbocompressor apparatus 100 operates on the basis of command rotational speed $\omega_C^*$ and command rotational speed $\omega_P^*$ that are different from those in the normal operation. Accordingly, the air-conditioning apparatus 140 also operates in a manner different from that in the normal operation.

In the present embodiment, in the decelerating operation, the command rotational speed $\omega_P^*$ of the pump motor 102 is set to target rotational speed for pump that is the same as that in the normal operation for the purpose of maintaining lubrication of the shaft bearings 124 by the lubrication pump 130. The second command alternating-current voltage vector, the amplitude thereof, the second alternating-current voltage vector, and the amplitude thereof are also the same as those in the normal operation. The same may apply to the stopping operation, but the command rotational speed $\omega_P^*$ may be lowered, for example, in a case where the amount of supply of the lubricant to the shaft bearings 124 can be lowered. Note that in the stopping operation of the present embodiment, flux weakening control of the pump motor 102 is performed in some cases. The flux weakening control is control for making a voltage vector of a motor equal to or smaller than a voltage limit value. As for details of flux weakening control, see, for example, Non-Patent Literature 1 and the aforementioned document "Umekomi Jisyaku Douki Mota No Sekkei To Seigyo (Design and Control of Interior Permanent Magnet Synchronous Motor)".

Figure 4:
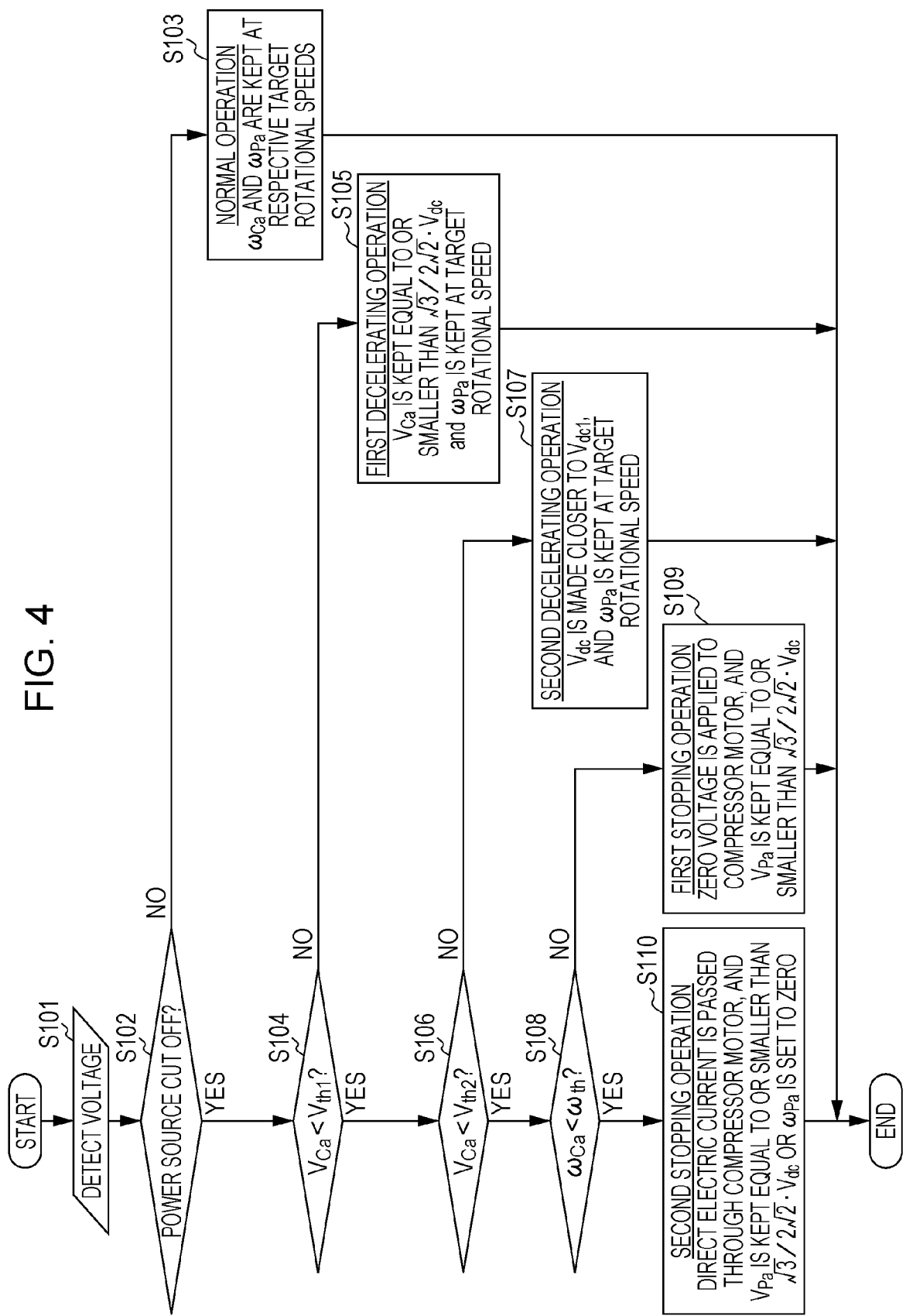
FIG. 4 is a flowchart illustrating a control method.
Figure 5:
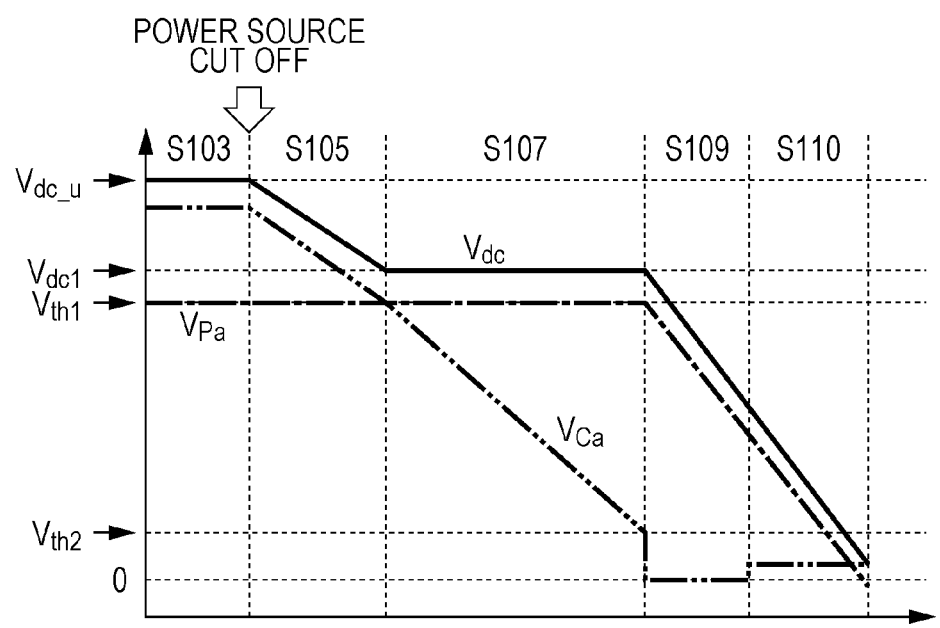
FIG. 5 is a timing chart for explaining control.

Control Flow and Time Chart of Normal Operation, Decelerating Operation, and Stopping Operation Conventionally, in a case where supply of electric power from the power source 110 to the converter 107 is cut off, the direct-current voltage $V_{dc}$ of the direct-current voltage unit 106 drops to zero. In this case, it becomes impossible to supply electric power from the pump inverter 105 to the pump motor 102, thereby making it impossible to lubricate the shaft bearings 124 by using the lubrication pump 130. However, in the present embodiment, even in a case where supply of electric power is cut off, lubrication of the shaft bearings 124 by the lubrication pump 130 is continued for a certain length of period. FIGS. 4 and 5 illustrate a control flow and a time chart of the normal operation, the decelerating operation, and the stopping operation of the turbocompressor apparatus 100 and the air-conditioning apparatus 140 of the present embodiment. In FIG. 5, the horizontal axis represents the time, and the vertical axis represents a voltage. The solid line indicates a change of the direct-current voltage $V_{dc}$ over time. The line with alternate long and short dashes indicates a change of the amplitude $V_{Pa}$ of the second command alternating-current voltage vector of the pump motor 102 over time. The line with alternate long and two short dashes indicates a change of the amplitude $V_{Ca}$ of the first command alternating-current voltage vector of the compressor motor 101 over time.

First, in Step S101, the voltage sensor 108 detects the direct-current voltage $V_{dc}$ of the direct-current voltage unit 106 (a direct-current voltage of the secondary terminal of the converter), and the voltage sensor 109 detects the voltage $V_s$ (a voltage of the primary terminal of the converter). After Step S101, the process proceeds to Step S102.

In Step S102, it is determined whether or not supply of electric power from the power source 110 to the converter 107 is being cut off.

In a case where electric power is being supplied from the power source 110 to the converter 107 (NO in Step S102), the process proceeds to Step S103, in which the normal operation is performed. As described above, in the normal operation of the present embodiment, the rotational speed $\omega_{Ca}$ of the compressor motor 101 is kept at target rotational speed for compressor motor, and the rotational speed $\omega_{Pa}$ of the pump motor 102 is kept at target rotational speed for pump motor. In the normal operation in this example, both of the target rotational speed for compressor motor and the target rotational speed for pump motor are constant (do not change over time). Note that $V_{dc\_u}$ in FIG. 5 represents the direct-current voltage $V_{dc}$ in the normal operation.

In a case where supply of electric power from the power source 110 to the converter 107 is being cut off (YES in Step S102), the process proceeds to Step S104. In Step S104, the amplitude $V_{Ca}$ of the first command alternating-current voltage vector of the compressor motor 101 is compared with a first threshold amplitude $V_{th1}$. In the present embodiment, the first threshold amplitude $V_{th1}$ is a constant. In the example illustrated in FIG. 5, the first threshold amplitude $V_{th1}$ is the same as the amplitude $V_{Pa}$ of the second command alternating-current voltage vector of the pump motor 102 in the normal operation. In another example, the first threshold amplitude $V_{th1}$ is larger than the amplitude $V_{Pa}$ in the normal operation.

In a case where the amplitude $V_{Ca}$ is equal to or larger than the first threshold amplitude $V_{th1}$ (No in Step S104), the process proceeds to Step S105, in which a first decelerating operation is performed. Since the first threshold amplitude $V_{th1}$ is sufficiently large, the first decelerating operation is not performed in a case where the amplitude $V_{Ca}$ is insufficient. This does not bring about a situation where the direct-current voltage $V_{dc}$ becomes insufficient and the amplitude $V_{Pa}$ becomes insufficient because of the first decelerating operation and the rotational speed $\omega_{Pa}$ of the pump motor 102 cannot be secured. In the first decelerating operation of the present embodiment, the rotational speed $\omega_{Ca}$ of the compressor motor 101 is adjusted so that the amplitude $V_{Ca}$ is equal to or smaller than a value obtained by multiplying the direct-current voltage $V_{dc}$ by $\sqrt{3}/2\sqrt{2}$. This allows the compressor inverter 103 to operate in a linear region, thereby allowing stable control of the compressor motor 101. From the perspective of safe control of the compressor motor 101, it is desirable that the amplitude $V_{Ca}$ is slightly smaller than the value obtained by multiplying the direct-current voltage $V_{dc}$ by $\sqrt{3}/2\sqrt{2}$. From this perspective, the amplitude $V_{Ca}$ can be, for example, 80% to 95% of the value obtained by multiplying the direct-current voltage $V_{dc}$ by $\sqrt{3}/2\sqrt{2}$. Note that the amplitude $V_{Ca}$ may be set equal to or smaller than the value obtained by multiplying the direct-current voltage $V_{dc}$ by $\sqrt{3}/2\sqrt{2}$ by adjusting the torque $T_{Ca}$ instead of the rotational speed $\omega_{Ca}$ of the compressor motor 101. In the first decelerating operation of the present embodiment, the amplitude $V_{Pa}$ is kept the same as that in the normal operation (same as the first threshold amplitude $V_{th1}$ in this example). In the first decelerating operation in this example, the target rotational speed for pump is the same as that in the normal operation. Accordingly, the rotational speed $\omega_{Pa}$ of the pump motor 102 is kept at target rotational speed same as that in the normal operation.

In a case where the amplitude $V_{Ca}$ is smaller than the first threshold amplitude $V_{th1}$ (YES in Step S104), the process proceeds to Step S106. In Step S106, the amplitude $V_{Ca}$ is compared with a second threshold amplitude $V_{th2}$. In the present embodiment, the second threshold amplitude $V_{th2}$ is a constant and is smaller than the amplitude $V_{Pa}$ of the second command alternating-current voltage vector of the pump motor 102 in the normal operation. The second threshold amplitude $V_{th2}$ is, for example, 5% to 30% of the amplitude $V_{Pa}$ of the second command alternating-current voltage vector of the pump motor 102 in the normal operation.

In a case where the amplitude $V_{Ca}$ is equal to or larger than the second threshold amplitude $V_{th2}$ (NO in Step S106), the process proceeds to Step S107, in which a second decelerating operation is performed. In the second decelerating operation of the present embodiment, the rotational speed $\omega_{Ca}$ of the compressor motor 101 is adjusted so that the direct-current voltage $V_{dc}$ becomes closer to a target direct-current voltage $V_{dc1}$. The target direct-current voltage $V_{dc1}$ is given by the formula 6. The margin $\Delta V$ is equal to or larger than 0 and is, for example, equal to or lower than 20% of the first threshold amplitude $V_{th1}$. In a specific example, the margin $\Delta V$ is 5% to 15% of the first threshold amplitude $V_{th1}$. By making the direct-current voltage $V_{dc}$ closer to such a target direct-current voltage $V_{dc1}$, the voltage $V_{dc}$ can be secured even in a case where the amplitude $V_{Ca}$ drops as illustrated in FIG. 5, and the amplitude $V_{Pa}$ can be secured while allowing the pump inverter 105 to operate in a linear region. Note that the direct-current voltage $V_{dc}$ may be made closer to the target direct-current voltage $V_{dc1}$ by adjusting the torque $T_{Ca}$ instead of the rotational speed $\omega_{Ca}$ of the compressor motor 101. In the second decelerating operation of the present embodiment, the amplitude $V_{Pa}$ is kept at a constant value that is the same as that in the normal operation (same as the first threshold amplitude $V_{th1}$ in this example). The rotational speed $\omega_{Pa}$ of the pump motor 102 is kept at target rotational speed that is the same as that in the normal operation.

$$V_{dcl} = \frac{2\sqrt{2}}{\sqrt{3}}(V_{th3} + \Delta V) \qquad \text{formula 6}$$

In a case where the amplitude $V_{Ca}$ is smaller than the second threshold amplitude $V_{th2}$ (YES in Step S106), the process proceeds to Step S108. In Step S108, the rotational speed $\omega_{Ca}$ of the compressor motor 101 is compared with threshold rotational speed $\omega_{th}$. In the present embodiment, the threshold rotational speed $\omega_{th}$ is a constant and is 0.1% to 5% of the rotational speed $\omega_{Ca}$ in the normal operation.

In a case where the rotational speed $\omega_{Ca}$ is equal to or higher than the threshold rotational speed $\omega_{th}$ (NO in Step S108), the process proceeds to Step S109, in which a first stopping operation is performed. In the first stopping operation of the present embodiment, a zero voltage is applied to the compressor motor 101 by using the compressor inverter 103 (zero voltage control). Although the rotational speed $\omega_{Ca}$ drops without application of a zero voltage, the rotational speed $\omega_{Ca}$ can be actively lowered by application of a zero voltage. In the first stopping operation of the present embodiment, the pump motor 102 is driven by flux weakening control by using the pump inverter 105. Specifically, the amplitude $V_{Pa}$ of the second command alternating-current voltage vector is set equal to or smaller than a value that is $\sqrt{3}/2\sqrt{2}$ times the direct-current voltage $V_{dc}$ by flux weakening control. This allows the pump inverter 105 to operate in a linear region, thereby making it possible to maintain stable control of the lubrication pump 130. The rotational speed $\omega_{Pa}$ of the pump motor 102 is easily kept the same as that in the normal operation. In another example of the present embodiment, the rotational speed $\omega_{Pa}$ of the pump motor 102 is lowered instead of performing flux weakening control or while performing flux weakening control. This also lowers the amplitude $V_{Pa}$, thereby allowing the pump inverter 105 to keep operating in a linear region.

In a case where the rotational speed $\omega_{Ca}$ is lower than the threshold rotational speed $\omega_{th}$ (YES in Step S108), the process proceeds to Step S110, in which a second stopping operation is performed. In the second stopping operation of the present embodiment, a direct electric current is passed through the compressor motor 101 by using the compressor inverter 103 (direct-current energization control). The direct-current energization control makes it possible to magnetically lock the rotor of the compressor 120, thereby speedily decreasing the rotational speed $\omega_{Ca}$ to zero with certainty. Furthermore, in the second stopping operation of the present embodiment, the pump motor 102 is driven by flux weakening control by using the pump inverter 105. Specifically, the amplitude $V_{Pa}$ of the second command alternating-current voltage vector is kept equal to or smaller than a value that is $\sqrt{3}/2\sqrt{2}$ times the direct-current voltage $V_{dc}$ by the flux weakening control. This allows the pump inverter 105 to keep operating in the linear region, thereby making it possible to maintain stable control of the lubrication pump 130. In another example of the present embodiment, the rotational speed $\omega_{Pa}$ of the pump motor 102 is lowered instead of performing flux weakening control or while performing flux weakening control. This also lowers the amplitude $V_{Pa}$, thereby allowing the pump inverter 105 to keep operating in the linear region. In still another example of the second stopping operation of the present embodiment, the pump motor 102 is stopped (the rotational speed $\omega_{Pa}$ is set to zero). Since there is a difference in pressure between a portion that precedes the lubrication pump 130 and a portion that follows the lubrication pump 130, the pump motor 102 can be stopped by bringing the pump motor 102 into a free running state. The free running state is a state where the pump motor 102 is not controlled by the control device 104 (and the pump inverter 105). The pump motor 102 may be stopped by using the pump inverter 105 (for example, by applying a zero voltage to the pump motor 102 or passing a direct electric current through the pump motor 102).

Since the rotational speed $\omega_{Ca}$ of the compressor motor 101 follows the command rotational speed $\omega_C^*$, the rotational speed $\omega_{Ca}$ is substantially the same as the command rotational speed $\omega_C^*$. For a similar reason, the rotational speed $\omega_{Pa}$ of the pump motor 102 is substantially the same as the command rotational speed $\omega_P^*$. The torque $T_{Ca}$ of the compressor motor 101 is substantially the same as the command torque $T_C^*$. The first alternating-current voltage vector is substantially the same as the first command alternating-current voltage vector. The amplitude of the first alternating-current voltage vector is substantially the same as the amplitude $V_{Ca}$ of the first command alternating-current voltage vector. The second alternating-current voltage vector is substantially the same as the second command alternating-current voltage vector. The amplitude of the second alternating-current voltage vector is substantially the same as the amplitude $V_{Pa}$ of the second command alternating-current voltage vector.

Effects

Effects of the present embodiment are summarized below. In the turbocompressor apparatus 100 of the present embodiment, in a case where supply of electric power from the power source 110 to the converter 107 is being cut off, the compressor motor 101 generates regenerative electric power by regenerative driving, and the pump motor 102 is driven by this regenerative electric power. Accordingly, even in a case where supply of electric power from the power source 110 to the converter 107 is cut off, it is possible to maintain driving of the lubrication pump 130 and thereby continue supply of a lubricant to the shaft bearings 124. It is therefore possible to decelerate and stop the compressor 120 while continuing lubrication of the shaft bearings 124.

The turbocompressor apparatus 100 of the present embodiment performs the normal operation in which the pump motor 102 is driven by using the voltage of the power source 110 in a case where electric power is being supplied from the power source 110 to the converter 107. Furthermore, the turbocompressor apparatus 100 of the present embodiment performs the first decelerating operation in which the amplitude of the first alternating-current voltage vector is set equal to or smaller than a value that is $R_1$ times the direct-current voltage $V_{dc}$ in a case where supply of electric power from the power source 110 to the converter 107 is being cut off and where the amplitude of the first alternating-current voltage vector is equal to or larger than the first threshold amplitude. Specifically, the amplitude of the first alternating-current voltage vector is set equal to or smaller than a value that is $R_1$ times the direct-current voltage $V_{dc}$ by adjusting the rotational speed $\omega_{Ca}$ or the torque $T_{Ca}$ of the compressor motor 101. The first threshold amplitude is equal to or larger than the amplitude of the second alternating-current voltage vector in the normal operation, $R_1$ is an upper limit value of a ratio of the amplitude of the first alternating-current voltage vector to the direct-current voltage $V_{dc}$ obtained in a case where the compressor inverter (first inverter) 103 operates in a linear region, and the linear region of the compressor inverter 103 is an operation region in which the amplitude of the first alternating-current voltage vector linearly changes in theory relative to the direct-current voltage $V_{dc}$. $R_1$ is, for example, $\sqrt{3}/2\sqrt{2}$ to $1/\sqrt{2}$. Specifically, $R_1$ is $\sqrt{3}/2\sqrt{2}$ in a case where the compressor inverter 103 operates according to the sine wave PWM method, whereas $R_1$ is $1/\sqrt{2}$ in a case where the compressor inverter 103 operates according to the third harmonic injection modulation method. As described above, the first decelerating operation of the present embodiment is performed in a case where the amplitude of the first alternating-current voltage vector is equal to or larger than the first threshold amplitude. Since the first threshold amplitude is equal to or larger than the amplitude of the second alternating-current voltage vector in the normal operation and is sufficiently large, it is unlikely to bring about a situation where the first decelerating operation is performed in a state where the amplitude of the first alternating-current voltage vector is insufficient and thereby the amplitude of the first alternating-current voltage vector further drops. That is, the amplitude of the first alternating-current voltage vector is unlikely to become insufficient, the regenerative electric power of the compressor motor 101 is unlikely to become insufficient, the direct-current voltage $V_{dc}$ is unlikely to become insufficient, the amplitude of the second alternating-current voltage vector is unlikely to become insufficient, and supply of a lubricant to the shaft bearings 124 of the compressor 120 is unlikely to become insufficient. In the first decelerating operation of the present embodiment, the compressor inverter 103 operates in the linear region. That is, according to the present embodiment, the compressor inverter 103 is prevented from operating in an overmodulation region, and a voltage waveform of the compressor motor 101 is prevented from being markedly distorted. It is therefore possible to maintain safe control of the compressor 120. Note that "the amplitude of the second alternating-current voltage vector in the normal operation" refers to an amplitude obtained in a case where the second alternating-current voltage vector is normally controlled and does not refer to an amplitude obtained in a case where the second alternating-current voltage vector is not normally controlled, for example, because of disturbance (external factor that disturbs the control).

The turbocompressor apparatus 100 of the present embodiment performs the second decelerating operation in which the direct-current voltage $V_{dc}$ is made closer to the target direct-current voltage in a case where supply of electric power from the power source 110 to the converter 107 is being cut off and where the amplitude of the first alternating-current voltage vector is equal to or larger than the second threshold amplitude and is smaller than the first threshold amplitude. Specifically, the direct-current voltage $V_{dc}$ is made closer to the target direct-current voltage by adjusting the rotational speed $\omega_{Ca}$ or the torque $T_{Ca}$ of the compressor motor 101. The second threshold amplitude is smaller than the amplitude of the second alternating-current voltage vector in the normal operation, the target direct-current voltage is equal to or larger than a value that is $1/R_2$ times the amplitude of the second alternating-current voltage vector in the normal operation, $R_2$ is an upper limit value of a ratio of the amplitude of the second alternating-current voltage vector to the direct-current voltage $V_{dc}$ obtained in a case where the pump inverter (second inverter) 105 operates in a linear region, and the linear region of the pump inverter 105 is an operation region in which the amplitude of the second alternating-current voltage vector linearly changes in theory relative to the direct-current voltage $V_{dc}$. $R_2$ is, for example, $\sqrt{3}/2\sqrt{2}$ to $1/\sqrt{2}$. Specifically, $R_2$ is $\sqrt{3}/2\sqrt{2}$ in a case where the pump inverter 105 operates according to the sine wave PWM method, and $R_2$ is $1/\sqrt{2}$ in a case where the pump inverter 105 operates according to the third harmonic injection modulation method. When the amplitude of the first alternating-current voltage vector drops, the regenerative electric power drops, and the direct-current voltage $V_{dc}$ becomes likely to be insufficient. When the direct-current voltage $V_{dc}$ becomes insufficient, the amplitude of the second alternating-current voltage vector becomes insufficient, and therefore there is a risk of insufficiency of supply of a lubricant to the shaft bearings 124 of the compressor 120. If the amplitude of the second alternating-current voltage vector is forcibly made large regardless of insufficiency of the direct-current voltage $V_{dc}$, the pump inverter 105 operates in an overmodulation region, and therefore there is a risk of unstable control of the pump motor 102. It is therefore desirable that a sufficient direct-current voltage $V_{dc}$ be secured even in a case where the amplitude of the first alternating-current voltage vector drops. In this respect, in the second decelerating operation of the present embodiment, the direct-current voltage $V_{dc}$ is made close to the target direct-current voltage in a case where the amplitude of the first alternating-current voltage vector is smaller than the first threshold amplitude. The target direct-current voltage is equal to or larger than a value that is $1/R_2$ times the amplitude of the second alternating-current voltage vector in the normal operation, and $R_2$ is an upper limit value of a ratio of the amplitude of the second alternating-current voltage vector to the direct-current voltage $V_{dc}$ obtained in a case where the second inverter operates in the linear region. Accordingly, the direct-current voltage $V_{dc}$ approaches a direct-current voltage at which the amplitude of the second alternating-current voltage vector that is the same as that in the normal operation can be obtained while allowing the pump inverter 105 to operate in a linear region. That is, according to the second decelerating operation of the present embodiment, it is easy to make the direct-current voltage $V_{dc}$ large to such a degree that a lubricant can be sufficiently and stably supplied to the shaft bearings 124 while maintaining stable control of the pump motor 102.

The turbocompressor apparatus 100 of the present embodiment performs the first stopping operation in which a zero voltage is applied to the compressor motor 101 and the amplitude of the second alternating-current voltage vector is set equal to or smaller than a value that is $R_2$ times the direct-current voltage $V_{dc}$ in a case where supply of electric power from the power source 110 to the converter 107 is being cut off, the amplitude of the first alternating-current voltage vector is smaller than the second threshold amplitude, and the rotational speed $\omega_{Ca}$ of the compressor motor 101 is equal to or higher than the threshold rotational speed $\omega_{th}$. In a case where the amplitude of the first alternating-current voltage vector is sufficiently small, the stopping operation of the turbocompressor apparatus 100 can be safely performed as compared with a case where the amplitude of the first alternating-current voltage vector is large. In this respect, in the present embodiment, the first stopping operation in which a zero voltage is applied to the compressor motor 101 is performed in a case where the amplitude of the first alternating-current voltage vector is smaller than the second threshold amplitude. The rotational speed $\omega_{Ca}$ of the compressor motor 101 drops due to application of the zero voltage to the compressor motor 101. Furthermore, in the first stopping operation of the present embodiment, the amplitude of the second alternating-current voltage vector is set equal to or smaller than a value that is $R_2$ times the direct-current voltage $V_{dc}$. $R_2$ is an upper limit value of a ratio of the amplitude of the second alternating-current voltage vector to the direct-current voltage $V_{dc}$ obtained in a case where the pump inverter 105 operates in a linear region. This allows the pump inverter 105 to operate in the linear region. That is, according to the first stopping operation of the present embodiment, even in a case where the stopping operation has progresses to a certain extent (in a case where the rotational speed $\omega_{Ca}$ of the compressor motor 101 is low), it is easy to maintain stable control of the lubrication pump 130 and stable supply of a lubricant to the shaft bearings 124. It is therefore easy to suppress wear of the shaft bearings 124 and the rotary shaft 123b.

In the first stopping operation of the present embodiment, the amplitude of the second alternating-current voltage vector is set equal to or smaller than the value that is $R_2$ times the direct-current voltage $V_{dc}$ by flux weakening control of the pump motor 102 and/or by adjusting the rotational speed $\omega_{Pa}$ of the pump motor 102. The flux weakening control of the pump motor 102 and/or adjustment of the rotational speed $\omega_{Pa}$ of the pump motor 102 allows the amplitude of the second alternating-current voltage vector to be easily set equal to or smaller than the value that is $R_2$ times the direct-current voltage $V_{dc}$.

The turbocompressor apparatus 100 of the present embodiment performs the second stopping operation in which a direct electric current is passed through the compressor motor 101 and the amplitude of the second alternating-current voltage vector is set equal to or smaller than a value that is $R_2$ times the direct-current voltage $V_{dc}$ in a case where supply of electric power from the power source 110 to the converter 107 is being cut off, the amplitude of the first alternating-current voltage vector is smaller than the second threshold amplitude, and the rotational speed $\omega_{Ca}$ of the compressor motor 101 is lower than the threshold rotational speed $\omega_{th}$. As described above, in the second stopping operation of the present embodiment, a direct electric current is passed through the compressor motor 101 (direct-current energization control). This allows the rotational speed $\omega_{Ca}$ of the compressor motor 101 to be speedily set to zero. It is therefore possible to suppress wear of the shaft bearings 124 and the rotary shaft 123b. Furthermore, in the second stopping operation of the present embodiment, the amplitude of the second alternating-current voltage vector is set equal to or smaller than the value that is $R_2$ times the direct-current voltage $V_{dc}$. As described above, this allows the pump inverter 105 to operate in the linear region. It is therefore possible to maintain stable control of the lubrication pump 130.

In the second stopping operation of the present embodiment, the amplitude of the second alternating-current voltage vector is set equal to or smaller than the value that is $R_2$ times the direct-current voltage $V_{dc}$ by flux weakening control of the pump motor 102 and/or by adjusting the rotational speed CO pa of the pump motor 102. The flux weakening control of the pump motor 102 and/or adjustment of the rotational speed $\omega_{Pa}$ of the pump motor 102 allows the amplitude of the second alternating-current voltage vector to be easily set equal to or smaller than the value that is $R_2$ times the direct-current voltage $V_{dc}$.

The turbocompressor apparatus 100 of the present embodiment passes a direct electric current through the compressor motor 101 and sets the rotational speed $\omega_{Pa}$ of the pump motor 102 to zero in a case where supply of electric power from the power source 110 to the converter 107 is being cut off, the amplitude of the first alternating-current voltage vector is smaller than the second threshold amplitude, and the rotational speed $\omega_{Ca}$ of the compressor motor 101 is lower than the threshold rotational speed $\omega_{th}$. In the second stopping operation of the present embodiment, a direct electric current is passed through the compressor motor 101 (direct-current energization control). This allows the rotational speed $\omega_{Ca}$ of the compressor motor 101 to be speedily set to zero. It is therefore possible to suppress wear of the shaft bearings 124 and the rotary shaft 123b. Furthermore, in the second stopping operation of the present embodiment, the rotational speed $\omega_{Pa}$ of the pump motor 102 is set to zero. This makes it possible to speedily stop the turbocompressor apparatus 100.

A fluid apparatus (air-conditioning apparatus) 140 of the present embodiment includes the turbocompressor apparatus 100. Accordingly, the fluid apparatus 140 has the same advantages as the turbocompressor apparatus 100.

In the present embodiment, the cooling medium is a fluid having a composition C, and the lubricant is also a fluid having the composition C. That is, the cooling medium and the lubricant are fluids having the same composition. This makes it unnecessary to separate the cooling medium and the lubricant even in a case where the cooling medium and the lubricant are mixed in the compressor 120. This leads to simplification of the apparatus.

In the present embodiment, the fluid having the composition C is a fluid containing water as a main component. Burden of water on the global environment is small. For example, water does not destroy an ozone layer and is not a cause of global warming. The fluid apparatus 140 of the present embodiment is environment-friendly. However, the fluid having the composition C may be a chlorofluorocarbon cooling medium or may be a cooling medium made of an alternative for chlorofluorocarbon.

In the present embodiment, the lubricant is the fluid having the composition C. The compressor 120 has the lubricant discharge passage 128 through which the lubricant that has been used to lubricate the shaft bearings 124 is discharged. The fluid apparatus 140 includes one or more flow passages 144, 145, and 146 through which the fluid having the composition C circulates. The lubricant supply passage 127 and the lubricant discharge passage 128 connect the one or more flow passages 144, 145, and 146 and the shaft bearings 124. In the present embodiment, the lubricant circulates in the fluid apparatus 140. That is, according to the present embodiment, the lubricant can be effectively utilized.

Second Embodiment

Second Embodiment is described below. Note that in Second Embodiment, parts that are similar to those in First Embodiment are given identical reference signs, and description thereof is sometimes omitted.

Figure 6:
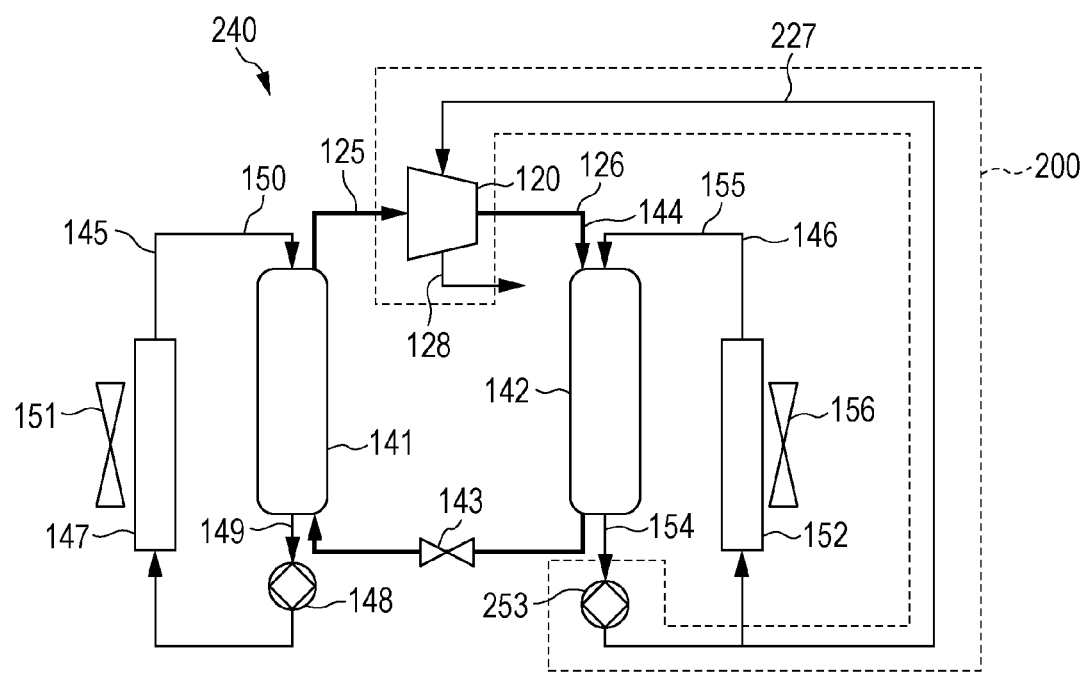
FIG. 6 is a diagram illustrating a configuration of an air-conditioning apparatus.

FIG. 6 illustrates an air-conditioning apparatus 240 of Second Embodiment. In the air-conditioning apparatus 240, a second feed passage 154 has a second pump 253. A branch passage 227 is connected at a position on a downstream side of the second pump 253 of the second feed passage 154. The branch passage 227 is connected to a compressor 120. The second pump 253 pressure-feeds a cooling medium not only to a second heat exchanger 152, but also to the compressor 120. The cooling medium guided to the compressor 120 is supplied as a lubricant to shaft bearings 124. That is, it can be said that the second pump 253 is a lubrication pump and the branch passage 227 is a lubricant supply passage. A turbocompressor apparatus 200 of the Second Embodiment includes the lubrication pump (second pump) 253 and the lubricant supply passage (branch passage) 227 instead of the lubrication pump 130 and the lubricant supply passage 127 of the turbocompressor apparatus 100 of First Embodiment.

In Second Embodiment, a single pump (second pump 253) plays the roles of the lubrication pump 130 and the second pump 153 of First Embodiment. Therefore, Second Embodiment is advantageous in terms of a reduction in system size and cost.

Third Embodiment

Third Embodiment is described below. Note that in Third Embodiment, parts that are similar to those in First Embodiment are given identical reference signs, and description thereof is sometimes omitted.

Figure 7:
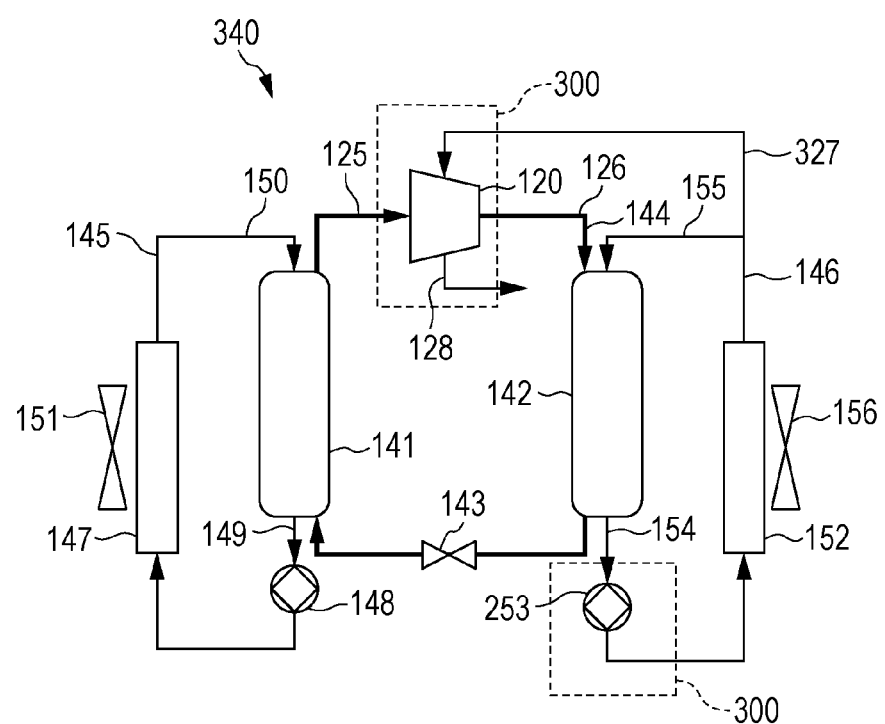
FIG. 7 is a diagram illustrating a configuration of an air-conditioning apparatus.

FIG. 7 illustrates an air-conditioning apparatus 340 of Third Embodiment. In the air-conditioning apparatus 340, a branch passage 327 is connected to a second return passage 155. The branch passage 327 is connected to a compressor 120. A second pump 253 pressure-feeds a cooling medium not only to a second heat exchanger 152, but also to the compressor 120. In this way, the cooling medium guided to the compressor 120 is supplied as a lubricant to shaft bearings 124. That is, it can be said that the second pump 253 is a lubrication pump and the branch passage 327 is a lubricant supply passage. The turbocompressor apparatus 300 of Third Embodiment includes the lubrication pump (second pump) 253 and the lubricant supply passage (branch passage) 327 instead of the lubrication pump 130 and the lubricant supply passage 127 of the turbocompressor apparatus 100 of First Embodiment.

In Third Embodiment, a single pump (second pump 253) plays roles of the lubrication pump 130 and the second pump 153 of First Embodiment. Therefore, Third Embodiment is advantageous in terms of a system size and cost. Reference: Specific Example of Method for Specifying Command Voltage Vector from Command Torque or Command Rotational Speed A specific example of a method for computing the three-phase command voltages $V_{Cu}^*$, $V_{Cv}^*$, and $V_{Cw}^*$ from the command torque $T_C^*$ or the command rotational speed $\omega_C^*$ of the compressor motor 101 and computing the three-phase command voltages $V_{Pu}^*$, $V_{Pv}^*$, and $V_{Pw}^*$ from the command rotational speed $\omega_P^*$ of the pump motor 102 is described below. Note that a method described below is an example, and other computing methods can also be employed.

Figure 8:
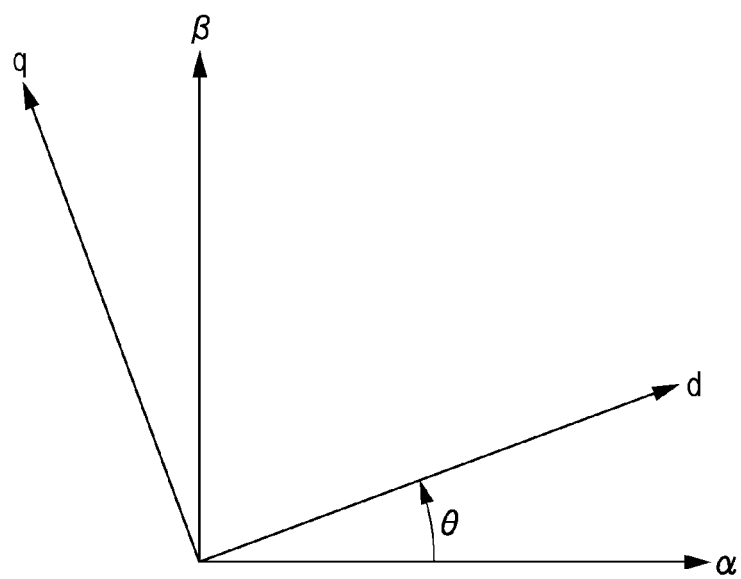
FIG. 8 is an explanatory view of a coordinate system.

The α-β coordinates and d-q coordinates are described with reference to FIG. 8. The α-β coordinates are fixed coordinates. The α-β coordinates are referred to as stationary coordinates or alternating-current coordinates. The α axis is set as an axis extending in the same direction as the U axis (omitted in FIG. 8). The d-q coordinates are rotating coordinates. The angle θ is a lead angle of the d axis viewed from the U axis. The angle θ is also referred to as a rotor position.

Figure 9:
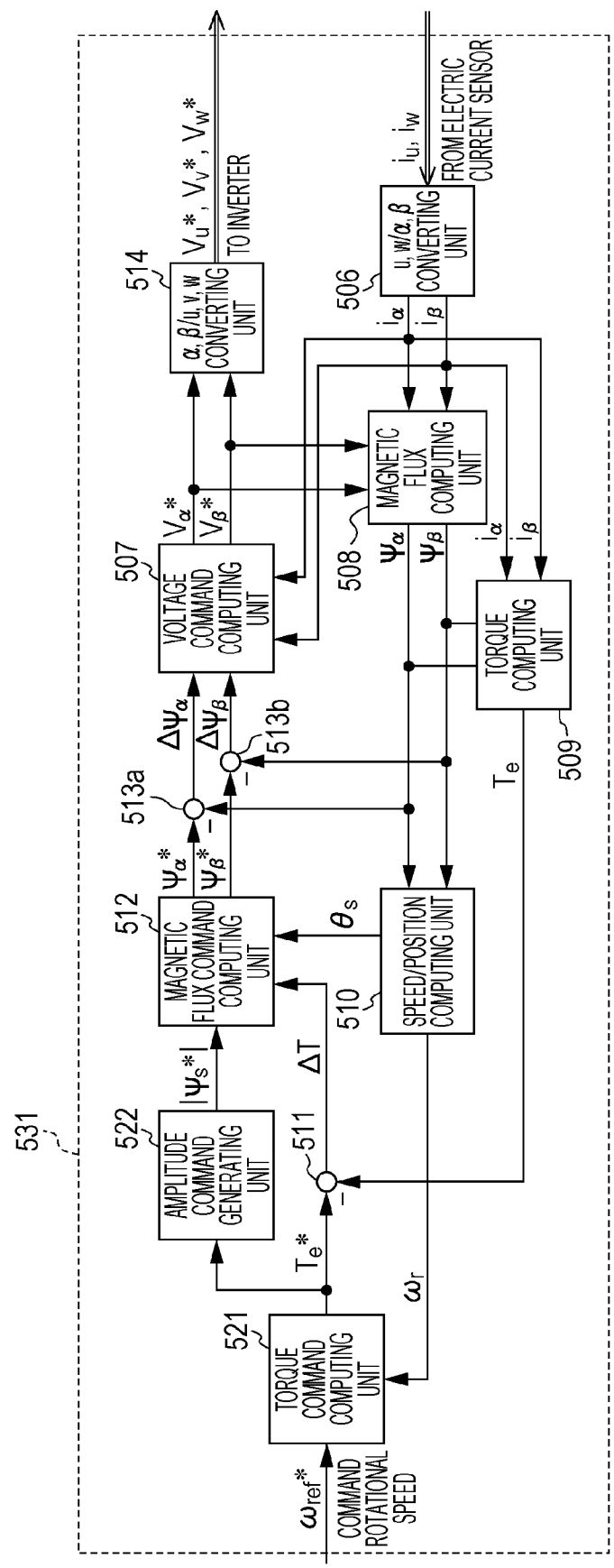
FIG. 9 is a block diagram of a control unit.

FIG. 9 illustrates a control unit 531 for computing three-phase command voltages $V_u^*$, $V_v^*$, and $V_w^*$ from command rotational speed $\omega_{ref}^*$ on the basis of the α-β coordinates. The control unit 531 includes a u,w/α,β converting unit 506, a voltage command computing unit 507, a magnetic flux computing unit 508, a torque computing unit 509, a speed/position computing unit 510, a torque command computing unit 521, a torque deviation computing unit 511, an amplitude command generating unit 522, a magnetic flux command computing unit 512, an α axis magnetic flux deviation computing unit 513a, a β axis magnetic flux deviation computing unit 513b, and an α,β/u,v,w converting unit 514. The control unit 531 can be realized by the control device 104.

u,w/α,β Converting Unit 506

The u,w/α,β converting unit 506 converts phase electric currents $i_u$ and $i_w$ of a motor into axis electric currents $i_\alpha$ and $i_\beta$. Specifically, the u,w/α,β converting unit 506 converts the phase electric currents $i_u$ and $i_w$ into the axis electric currents $i_\alpha$ and $i_\beta$ according to the formulas 7 and 8. The phase electric currents $i_u$ and $i_w$ can be measured by using a known electric current sensor.

$$i_\alpha = \sqrt{\frac{3}{2}} i_u \qquad \text{formula 7}$$

$$i_\beta = -\frac{1}{\sqrt{2}} i_u - \sqrt{2} I_w \qquad \text{formula 8}$$

Magnetic Flux Computing Unit 508

The magnetic flux computing unit 508 estimates a magnetic flux (motor magnetic flux) of a motor. Specifically, the magnetic flux computing unit 508 finds an estimated magnetic flux $\Psi_s$ (estimated magnetic fluxes $\Psi_\alpha$ and $\Psi_\beta$) from the axis electric currents $i_\alpha$ and $i_\beta$ and command axis voltages $v_\alpha^*$ and $v_\beta^*$. More specifically, the magnetic flux computing unit 508 finds the estimated magnetic fluxes $\Psi_\alpha$ and $\Psi_\beta$ and an absolute value $|\Psi_s|$ of the estimated magnetic flux $\Psi_s$ by using the formulas 9, 10, and 11. $\Psi_{\alpha|t=0}$ and $\Psi_{\beta|t=0}$ in the formulas 9 and 10 are initial values of the estimated magnetic fluxes $\Psi_\alpha$ and $\Psi_\beta$, respectively. R in the formulas 9 and 10 is coil resistance of the motor. In a case where the magnetic flux computing unit 508 is incorporated into a digital control device such as a DSP or a microcomputer, an integrator needed for computation in the formulas 9 and 10 can be constituted by a discrete system. In this case, it is only necessary to add or subtract a value derived from a current control period to or from the estimated magnetic fluxes $\Psi_\alpha$ and $\Psi_\beta$ in the last control period.)

$$\Psi_\alpha = \int (v_\alpha^* - Ri_\alpha)dt + \Psi_{\alpha|t=0} \qquad \text{formula 9}$$

$$\Psi_\beta = \int (v_\beta^* - Ri_\beta)dt + \Psi_{\beta|t=0} \qquad \text{formula 10}$$

$$|\Psi_s| = \sqrt{\Psi_\alpha^2 + \Psi_\beta^2} \qquad \text{formula 11}$$

Torque Computing Unit 509

The torque computing unit 509 estimates torque (motor torque) of the motor. Specifically, the torque computing unit 509 finds estimated torque $T_e$ from the axis electric currents $i_\alpha$ and $i_\beta$ and the estimated magnetic flux $\Psi_s$ (the estimated magnetic fluxes $\Psi_\alpha$ and $\Psi_\beta$). More specifically, the torque computing unit 509 finds the estimated torque $T_e$ by using the formula 12. $P_n$ in the formula 12 is the number of pole pairs of the motor.

$$T_e = P_n(\Psi_\alpha i_\beta - \Psi_\beta i_\alpha) \qquad \text{formula 12}$$

Speed/position Computing Unit 510

The speed/position computing unit 510 finds a phase $\theta_s$ of the estimated magnetic flux $\Psi_s$ from the estimated magnetic flux $\Psi_s$ (the estimated magnetic fluxes $\Psi_\alpha$ and $\Psi_\beta$). Specifically, the speed/position computing unit 510 finds the phase $\theta_s$ of the estimated magnetic flux $\Psi_s$ according to the formula 13. Furthermore, the speed/position computing unit 510 finds estimated rotational speed $\omega_r$ according to the formula 14 by using a phase $\theta_s(n)$ found in the current control period and a phase $\theta_s(n-1)$ found in the last control period. The speed/position computing unit 510 is a known phase estimator. In the formula 14, $T_s$ is a control period (sampling period) and n is a time step.

$$\theta_\lambda = \tan^{-1}(\Psi_\beta/\Psi_\alpha) \qquad \text{formula 13}$$

$$\omega_r = \frac{\theta_s(n) - \theta_x(n-1)}{T_s} \qquad \text{formula 14}$$

Torque Command Computing Unit 521

The torque command computing unit 521 finds command torque $T_e^*$ from the command rotational speed $\omega_{ref}^*$ and the estimated rotational speed $\omega_r$. Specifically, the torque command computing unit 521 finds the command torque $T_e^*$ according to the formula 15. In the formula 15, $K_{sP}$ is a proportional gain, and $K_{sI}$ is an integration gain. The torque command computing unit 521 is a known PI compensator.

$$T_e^* = (K_{sP} + K_{sI}/s)(\omega_{ref}^* - \omega_r) \qquad \text{formula 15}$$

Amplitude Command Generating Unit 522

The amplitude command generating unit 522 finds a command amplitude $|\Psi_s^*|$ from the command torque $T_e^*$. The amplitude command generating unit 522 can be realized by using a look-up table, an operator storing a calculation formula (approximation formula), and the like. In a case where a look-up table is used, a look-up table showing correspondence between the command torque $T_e^*$ and the command amplitude $|\Psi_s^*|$ need just be prepared in advance. The calculation formula in the operator can also be prepared in advance. Such look-up table and calculation formula can be set on the basis of data measured in advance or a theory. A specific method for specifying the command amplitude $|\Psi_s^*|$ can be understood by referring to a known document (e.g., Yoji TAKEDA, Shigeo MORIMOTO, Nobuyuki MATSUI, Yukio HONDA "Umekomi Jisyaku Douki Mota No Sekkei To Seigyo (Design and Control of Interior Permanent Magnet Synchronous Motor)" Ohmsha, Ltd., issued on Oct. 25, 2001). It is also possible to use a relationship between a magnetic flux and torque that satisfies maximum torque per ampere (MTPA) control in which maximum torque can be generated by a minimum electric current.

Torque Deviation Computing Unit 511

The torque deviation computing unit 511 finds a deviation (torque deviation $\Delta T$: $T_e^* - T_e$) between the command torque $T_e^*$ and the estimated torque $T_e$. A known operator can be used as the torque deviation computing unit 511.

Magnetic Flux Command Computing Unit 512

The magnetic flux command computing unit 512 finds a command magnetic flux vector $\Psi_s^*$ (command magnetic fluxes $\Psi_\alpha^*$ and $\Psi_\beta^*$) from the command amplitude $|\omega_s^*|$ the torque deviation $\Delta T$, and the phase $\theta_s$. Specifically, the magnetic flux command computing unit 512 finds a phase $\theta_s^*$ of the command magnetic flux vector $\Psi_s^*$ according to the formula 16 by using the formula 17 for finding an amount of rotation $\Delta\theta_s$ of the motor magnetic flux. The magnetic flux command computing unit 512 finds the command magnetic fluxes $\Psi_\alpha^*$ and $\Psi_\beta^*$ by using the formulas 18 and 19. In the formula 16, $K_{\theta P}$ is a proportional gain, and $K_{\theta I}$ is an integration gain. The magnetic flux command computing unit 512 makes the torque deviation $\Delta T$ closer to zero. In this respect, it can be said that the magnetic flux command computing unit 512 constitutes a torque compensating mechanism. In a case where the magnetic flux command computing unit 512 is incorporated into a digital control device such as a DSP or a microcomputer, an integrator needed for computation in the formula 16 can be constituted by a discrete system.

$$\Delta\theta_s = (K_{\theta P} + K_{\theta I}/s)\Delta T \qquad \text{formula 16}$$

$$\theta_s^* = \theta_s + \Delta\theta_s \qquad \text{formula 17}$$

$$\Psi_\alpha^* = |\Psi_s^*| \cos\theta_2^* \qquad \text{formula 18}$$

$$\Psi_\beta^* = |\Psi_s^*| \sin\theta_2^* \qquad \text{formula 19}$$

α Axis Magnetic Flux Deviation Computing Unit 513a and β Axis Magnetic Flux Deviation Computing Unit 513b The α axis magnetic flux deviation computing unit 513a acquires the command magnetic flux $\Psi_\alpha^*$ and the estimated magnetic flux $\Psi_\alpha$ and finds a deviation (magnetic flux deviation $\Delta\Psi_\alpha : \Psi_\alpha^* - \Psi_\alpha$) between the command magnetic flux $\Psi_\alpha^*$ and the estimated magnetic flux $\Psi_\alpha$. The β axis magnetic flux deviation computing unit 513b acquires the command magnetic flux $\Psi_\beta^*$ and the estimated magnetic flux $\Psi_\beta$ and finds a deviation (magnetic flux deviation $\Delta\Psi_\beta : \Psi_\beta^* - \Psi_\beta$) between the command magnetic flux $\Psi_\beta^*$ and the estimated magnetic flux $\Psi_\beta$. A known operator can be used as each of the magnetic flux deviation computing units 513a and 513b.

Voltage Command Computing Unit 507

The voltage command computing unit 507 finds the command axis voltages $v_\alpha^*$ and $v_\beta^*$ from the magnetic flux deviations $\Delta\Psi_\alpha$ and $\Delta\Psi_\beta$ and the axis electric currents $i_\alpha$ and $i_\beta$. Specifically, the voltage command computing unit 507 finds the α axis command voltage $v_\alpha^*$ by using the formula 20. Furthermore, the voltage command computing unit 507 finds the β axis command voltage $v_\beta^*$ by using the formula 21.

$$v_\alpha^* = \frac{\Delta\Psi_\alpha}{T_s} + R i_\alpha \qquad \text{formula 20}$$

$$v_\beta^* = \frac{\Delta\Psi_\beta}{T_x} + R i_\beta \qquad \text{formula 21}$$

(α,β/u,v,w Converting Unit 514)

The α,β/u,v,w converting unit 514 converts the command axis voltages $v_\alpha^*$ and $v_\beta^*$ into command voltage vectors $v_u^*$, $v_v^*$, and $v_w^*$. Specifically, the α,β/u,v,w converting unit 514 converts the command axis voltages $v_\alpha^*$ and $v_\beta^*$ into the command voltage vectors $v_u^*$, $v_v^*$, and $v_w^*$ according to the formula 22.

$$\begin{bmatrix} v_u^* \\ v_v^* \\ v_w^* \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_\alpha^* \\ v_\beta^* \end{bmatrix} \qquad \text{formula 22}$$

In the example of FIG. 9, in a case where the command rotational speed $\omega_C^*$ is used the command rotational speed $\omega_{ref}^*$, the three-phase command voltages $V_{Cu}^*$, $V_{Cv}^*$, and $V_{Cw}^*$ can be obtained. Meanwhile, in a case where the command rotational speed $\omega_P^*$ is used as the command rotational speed $\omega_{ref}^*$, the three-phase command voltages $V_{Pu}^*$, $V_{Pv}^*$, and $V_{Pw}^*$ can be obtained.

Furthermore, in the example of FIG. 9, the command torque $T_e^*$ is specified from the command rotational speed $\omega_{ref}^*$. In a case where the command torque $T_e^*$ is given from a higher-level control device, it is unnecessary to specify the command torque $T_e^*$ from the command rotational speed $\omega_{ref}^*$. In this case, control that is similar to that in the example of FIG. 9 can be performed by omitting the torque command computing unit 521 and inputting the given command torque $T_e^*$ to the amplitude command generating unit 522 and the torque deviation computing unit 511. As a matter of course, it is also possible to specify the three-phase command voltages $V_{Pu}^*$, $V_{Pv}^*$, and $V_{Pv}^*$ by using the command torque $T_C^*$ as the command torque $T_e^*$.

Figure 10:
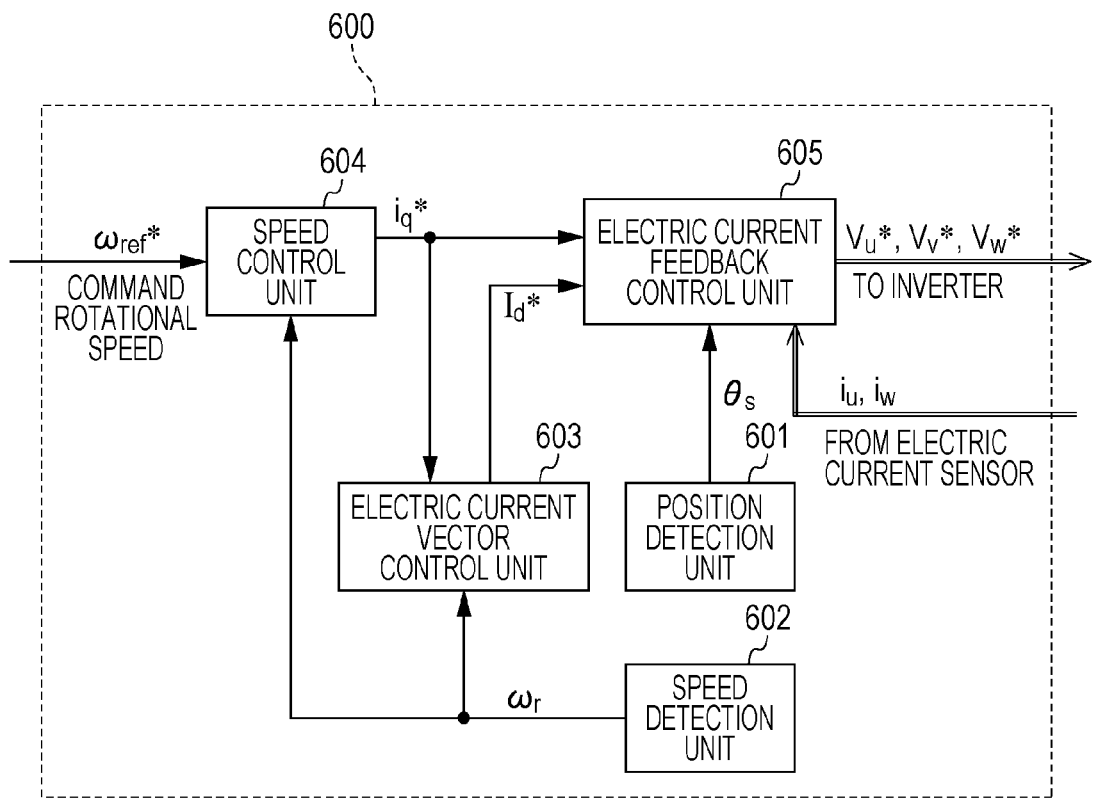
FIG. 10 is a block diagram of a control unit.

FIG. 10 illustrates a control unit 600 for computing the three-phase command voltages $V_u^*$, $V_v^*$, and $V_w^*$ from the command rotational speed $\omega_{ref}^*$ on the basis of the d-q coordinates. As illustrated in FIG. 10, the control unit 600 includes a position detection unit 601, a speed detection unit 602, an electric current vector control unit 603, a speed control unit 604, and an electric current feedback control unit 605. The control unit 600 can be realized by the control device 104.

Position Detection Unit 601

The position detection unit 601 detects the phase $\theta_s$ of the magnetic flux of the motor (motor magnetic flux). The position detection unit 601 can be realized by a position sensor (e.g., an encoder, a resolver). The phase $\theta_s$ can also be estimated without using a position sensor (see, for example, Chapter 5 of "Umekomi Jisyaku Douki Mota No Sekkei To Seigyo (Design and Control of Interior Permanent Magnet Synchronous Motor)").

Speed Detection Unit 602

The speed detection unit 602 detects rotational speed $\omega_r$ of the motor. The position detection unit 601 can be realized by a speed sensor. However, the rotational speed $\omega_r$ can also be estimated without using a speed sensor (see, for example, Chapter 5 of "Umekomi Jisyaku Douki Mota No Sekkei To Seigyo (Design and Control of Interior Permanent Magnet Synchronous Motor)"). The rotational speed $\omega_r$ can also be found from the phase $\theta_s$ by using the formula 14.

Note that detection of the phase $\theta_s$ using a position sensor and detection of the rotational speed $\omega_r$ using a speed sensor can also be applied to the control unit 531 of FIG. 9.

Speed Control Unit 604

The speed control unit 604 specifies a q axis command electric current $i_q^*$ from the rotational speed $\omega_r$ and the command rotational speed $\omega_{ref}^*$. Specifically, the speed control unit 604 specifies the q axis command electric current $i_q^*$ by feedback control (e.g., PI control) for setting a deviation between the rotational speed $\omega_r$ and the command rotational speed $\omega_{ref}^*$ to zero.

Electric Current Vector Control Unit 603

The electric current vector control unit 603 specifies a d axis command electric current $i_d^*$ from the q axis command electric current $i_q^*$ and the rotational speed $\omega_r$. Specifically, in the case of MTPA, the electric current vector control unit 603 specifies the d axis command electric current $i_d^*$ on the basis of the formula 23. $|\Psi_a|$ is a magnetic flux parameter. The magnetic flux parameter $|\Psi_a|$ is a constant given as an amplitude of a magnet magnetic flux vector (also referred to as a field magnetic flux vector) created by a permanent magnet in the motor. $L_d$ is d-axis inductance. $L_q$ is q-axis inductance. In the case of weakening flux control, the electric current vector control unit 603 specifies the d axis command electric current $i_d^*$ on the basis of the formula 24. $V_{om}$ is a voltage limit value. Control based on the formula 24 prevents the voltage vector of the motor from exceeding the voltage limit value $V_{om}$. As for details of the control based on the formula 23 and the formula 24, see, for example, Chapter 2 of "Umekomi Jisyaku Douki Mota No Sekkei To Seigyo (Design and Control of Interior Permanent Magnet Synchronous Motor)".

$$i_d^* = \frac{|\psi_a|}{2(L_q - L_d)} - \sqrt{\frac{|\psi_a|^2}{4(L_q - L_d)^2} + i_q^{*2}} \quad \text{formula 23}$$

$$i_d^* = \frac{|\psi_a| + \sqrt{\left(\frac{V_{om}}{\omega_r}\right)^2 - (L_q i_q^*)^2}}{L_d} \quad \text{formula 24}$$

Electric Current Feedback Control Unit 605

The electric current feedback control unit 605 specifies the command voltages $V_u^*$, $V_v^*$, and $V_w^*$ from the command axis electric currents $i_d^*$ and $i_q^*$, the phase electric currents $i_u$ and $i_w$ of the motor, and the phase $\theta_s$. The phase electric currents $i_u$ and $i_w$ can be measured by using a known electric current sensor. Specifically, the electric current feedback control unit 605 converts the phase electric currents $i_u$ and $i_w$ into the axis electric currents $i_d$ and $i_q$ on the basis of the formula 25 and the formula 26. The electric current feedback control unit 605 specifies command axis voltages $v_d^*$ and $v_q^*$ by feedback control (specifically, PI control) for setting a deviation between the axis electric currents $i_d$ and $i_q$ and the command axis electric currents $i_d^*$ and $i_q^*$ to zero. Specifically, the electric current feedback control unit 605 specifies the command axis voltages $v_d^*$ and $v_q^*$ on the basis of the formula 27 and the formula 28. In the formula 27 and the formula 28, $K_{cdP}$ and $K_{cqP}$ are proportional gains, and $K_{cdI}$ and $K_{cqI}$ are integration gains. The electric current feedback control unit 605 specifies the command voltages $V_u^*$, $V_v^*$, and $V_w^*$ from the phase $\theta_s$ and the command axis voltages $v_d^*$ and $v_q^*$. Specifically, the electric current feedback control unit 605 converts the command axis voltages $v_d^*$ and $v_q^*$ into the command voltages $V_u^*$, $V_v^*$, and $V_w^*$ on the basis of the formula 29.

$$i_v = -(i_u + i_w) \quad \text{formula 25}$$

$$\begin{bmatrix} i_d \\ i_q \end{bmatrix} = \sqrt{\frac{2}{3}} \begin{bmatrix} \cos\theta_s & \cos\left(\theta_s - \frac{2}{3}\pi\right) & \cos\left(\theta_s + \frac{2}{3}\pi\right) \\ -\sin\theta_s & -\sin\left(\theta_x - \frac{2}{3}\pi\right) & -\sin\left(\theta_s + \frac{2}{3}\pi\right) \end{bmatrix} \begin{bmatrix} i_u \\ i_v \\ i_w \end{bmatrix} \quad \text{formula 26}$$

$$v_d^* = (K_{cdP} + K_{cdI}/s)(i_d^* - i_d) \quad \text{formula 27}$$

$$v_q^* = (K_{cqP} + K_{cqI}/s)(i_q^* - i_q) \quad \text{formula 28}$$

$$\begin{bmatrix} v_u^* \\ v_v^* \\ v_w^* \end{bmatrix} = \sqrt{\frac{2}{3}} \begin{bmatrix} \cos\theta_s & \cos\left(\theta_x - \frac{2}{3}\pi\right) & \cos\left(\theta_x + \frac{2}{3}\pi\right) \\ -\sin\theta_s & -\sin\left(\theta_s - \frac{2}{3}\pi\right) & -\sin\left(\theta_s + \frac{2}{3}\pi\right) \end{bmatrix}^{-1} \begin{bmatrix} v_d^* \\ v_q^* \end{bmatrix} \quad \text{formula 29}$$

In the example of FIG. 10, in a case where the command rotational speed $\omega_C^*$ is used as the command rotational speed $\omega_{ref}^*$, the three-phase command voltages $V_{Cu}^*$, $V_{Cv}^*$, and $V_{Cw}*$ can be obtained. Meanwhile, in a case where the command rotational speed $\omega_P*$ is used as the command rotational speed $\omega_{ref}*$, the three-phase command voltages $V_{Pu}*$, $V_{Pv}*$, and $V_{Pw}*$ can be obtained.

Figure 11:
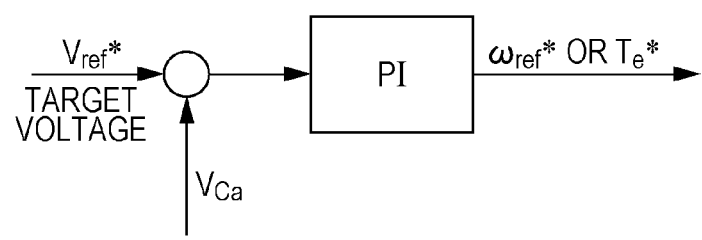
FIG. 11 is an explanatory view of a higher-level control device.
Figure 12:
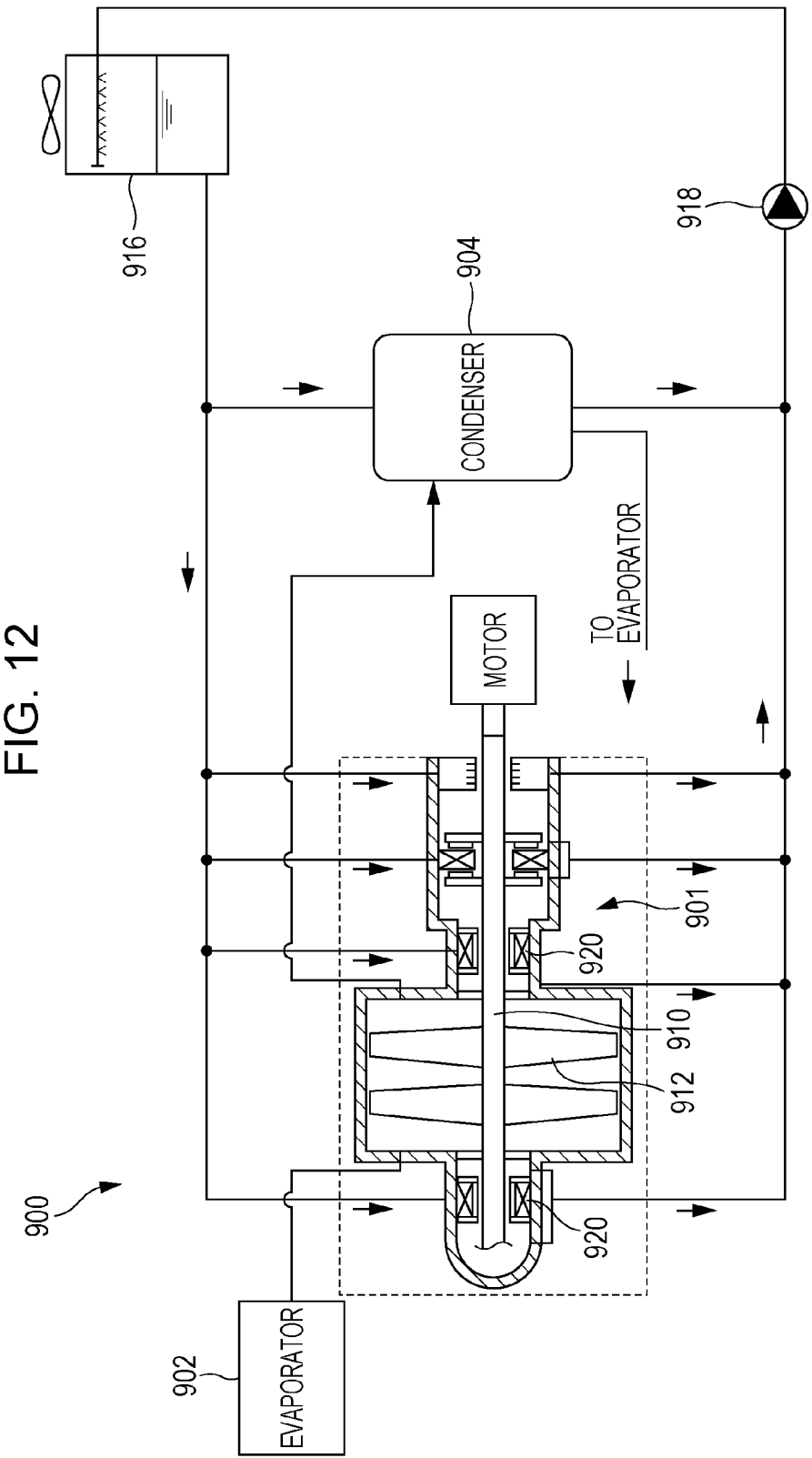
FIG. 12 is a diagram illustrating a configuration of a freezing machine of a conventional art.

A method for specifying the command rotational speed $\omega_{ref}*$ in the higher-level control device is not limited in particular. An example of the higher-level control device operates in accordance with FIG. 11. Specifically, the higher-level control device in this example can specify the command rotational speed $\omega_{ref}*$ by feedback control (e.g., PI control) for setting a deviation between the amplitude $V_{Ca}$ of the first command alternating-current voltage vector and a target voltage $V_{ref}*$ to zero. The command rotational speed $\omega_{ref}*$ thus specified can be used for the control in FIGS. 9 and 10. Note that in a case where the turbocompressor apparatus performs the second decelerating operation (corresponding to Step S107 in FIG. 5), the target voltage $V_{ref}*$ for the compressor motor 101 can be set to $V_{th1}+\Delta V$ in the formula 6. In a case where the turbocompressor apparatus performs the first decelerating operation (corresponding to Step S105 in FIG. 5), the target voltage $V_{ref}*$ for the compressor motor 101 can be gradually made smaller within a range of not less than $V_{th1}+\Delta V$. Note that the higher-level control device may specify the command torque $T_e*$ by feedback control (e.g., PI control) for setting a deviation between the amplitude $V_{Ca}$ of the first command alternating-current voltage vector and the target voltage $V_{ref}*$ to zero.

An air-conditioning apparatus according to the present disclosure is useful as a household air-conditioner, an industrial air-conditioner, and the like. A turbocompressor apparatus according to the present disclosure is useful as an air-conditioning apparatus and the like.

What is claimed is:

1. A turbocompressor apparatus that is connectable to a power source, comprising:
    a turbocompressor including:
        a rotary shaft;
        a shaft bearing that supports the rotary shaft;
        a compression mechanism that compresses and discharges a cooling medium by rotation of the rotary shaft;
        a compressor motor that rotates the rotary shaft; and
        a lubricant supply passage through which a lubricant is supplied to the shaft bearing,
    a lubrication pump including a pump motor that generates driving force for supplying the lubricant to the shaft bearing through the lubricant supply passage;
    a converter that performs electric power conversion between a voltage of the power source and a direct-current voltage of a direct-current voltage unit in a case where electric power is being supplied from the power source to the converter;
    a first inverter that performs electric power conversion between the direct-current voltage and a first alternating-current voltage vector of the compressor motor; and
    a second inverter that performs electric power conversion between the direct-current voltage and a second alternating-current voltage vector of the pump motor,
    the compressor motor generating regenerative electric power by regenerative driving and the pump motor being driven by the regenerative electric power in a case where supply of electric power from the power source to the converter is being cut off,
    wherein the turbocompressor apparatus performs a normal operation in which the pump motor is driven by using the voltage of the power source in a case where electric power is being supplied from the power source to the converter;
    the turbocompressor apparatus performs a first decelerating operation in which an amplitude of the first alternating-current voltage vector is set equal to or smaller than a value that is $R_1$ times the direct-current voltage in a case where supply of electric power from the power source to the converter is being cut off and where the amplitude of the first alternating-current voltage vector is equal to or larger than a first threshold amplitude; and
    the first threshold amplitude is equal to or larger than an amplitude of the second alternating-current voltage vector in the normal operation, $R_1$ is an upper limit value of a ratio of the amplitude of the first alternating-current voltage vector to the direct-current voltage obtained in a case where the first inverter operates in a linear region, and the linear region of the first inverter is an operation region in which the amplitude of the first alternating-current voltage vector linearly changes in theory relative to the direct-current voltage.

2. The turbocompressor apparatus according to claim 1, wherein
    in the first decelerating operation, the amplitude of the first alternating-current voltage vector is set equal to or smaller than the value that is RI times the direct-current voltage by adjusting a rotational speed or torque of the compressor motor.

3. The turbocompressor apparatus according to claim 1, wherein
    the turbocompressor apparatus performs a second decelerating operation in which the direct-current voltage is made closer to a target direct-current voltage in a case where supply of electric power from the power source to the converter is being cut off and where an amplitude of the first alternating-current voltage vector is equal to or larger than a second threshold amplitude and smaller than the first threshold amplitude; and
    the first threshold amplitude is equal to or larger than an amplitude of the second alternating-current voltage vector in the normal operation, the second threshold amplitude is smaller than the amplitude of the second alternating-current voltage vector in the normal operation, the target direct-current voltage is equal to or larger than a value that is $1/R_2$ times the amplitude of the second alternating-current voltage vector in the normal operation, $R_2$ is an upper limit value of a ratio of the amplitude of the second alternating-current voltage vector to the direct-current voltage obtained in a case where the second inverter operates in a linear region, and the linear region of the second inverter is an operation region in which the amplitude of the second alternating-current voltage vector linearly changes in theory relative to the direct-current voltage.

4. The turbocompressor apparatus according to claim 3, wherein
    in the second decelerating operation, the direct-current voltage is made closer to the target direct-current voltage by adjusting a rotational speed or torque of the compressor motor.

5. The turbocompressor apparatus according to claim 1, wherein
    the turbocompressor apparatus performs a first stopping operation in which a zero voltage is applied to the compressor motor and an amplitude of the second alternating-current voltage vector is set equal to or larger than a value that is $R_2$ times the direct-current voltage in a case where supply of electric power from the power source to the converter is being cut off, an amplitude of the first alternating-current voltage vector is smaller than a second threshold amplitude, and a rotational speed of the compressor motor is equal to or higher than a threshold rotational speed;

the second threshold amplitude is smaller than the amplitude of the second alternating-current voltage vector in the normal operation, $R_2$ is an upper limit value of a ratio of the amplitude of the second alternating-current voltage vector to the direct-current voltage obtained in a case where the second inverter operates in a linear region, and the linear region of the second inverter is an operation region in which the amplitude of the second alternating-current voltage vector linearly changes in theory relative to the direct-current voltage.

6. The turbocompressor apparatus according to claim 5, wherein in the first stopping operation, the amplitude of the second alternating-current voltage vector is set equal to or smaller than the value that is $R_2$ times the direct-current voltage by flux weakening control of the pump motor and/or by adjusting a rotational speed of the pump motor.

7. The turbocompressor apparatus according to claim 5, wherein the turbocompressor apparatus performs a second stopping operation in which a direct electric current is passed through the compressor motor and the amplitude of the second alternating-current voltage vector is set equal to or smaller than a value that is $R_2$ times the direct-current voltage in a case where supply of electric power from the power source to the converter is being cut off, an amplitude of the first alternating-current voltage vector is smaller than a second threshold amplitude, and the rotational speed of the compressor motor is smaller than the threshold rotational speed; and the second threshold amplitude is smaller than the amplitude of the second alternating-current voltage vector in the normal operation, $R_2$ is an upper limit value of a ratio of the amplitude of the second alternating-current voltage vector to the direct-current voltage obtained in a case where the second inverter operates in the linear region, and the linear region of the second inverter is an operation region in which the amplitude of the second alternating-current voltage vector linearly changes in theory relative to the direct-current voltage.

8. The turbocompressor apparatus according to claim 7, wherein in the second stopping operation, the amplitude of the second alternating-current voltage vector is set equal to or smaller than the value that is $R_2$ times the direct-current voltage by flux weakening control of the pump motor and/or by adjusting a rotational speed of the pump motor.

9. The turbocompressor apparatus according to claim 1, wherein the turbocompressor apparatus passes a direct electric current through the compressor motor and sets a rotational speed of the pump motor to zero in a case where supply of electric power from the power source to the converter is being cut off, an amplitude of the first alternating-current voltage vector is smaller than a second threshold amplitude, and a rotational speed of the compressor motor is smaller than a threshold rotational speed; and the second threshold amplitude is smaller than an amplitude of the second alternating-current voltage vector in the normal operation.

10. The turbocompressor apparatus according to claim 1, wherein the direct-current voltage unit is an electric wire that electrically connects the converter, the first inverter, and the second inverter.

* * * * *